US009565608B2

(12) United States Patent
Badic et al.

(10) Patent No.: US 9,565,608 B2
(45) Date of Patent: Feb. 7, 2017

(54) METHOD FOR PERFORMING MOBILE COMMUNICATIONS AND MOBILE RADIO COMMUNICATION TERMINAL DEVICE

(71) Applicant: Intel IP Corporation, Santa Clara, CA (US)

(72) Inventors: Biljana Badic, Duesseldorf (DE); Rajarajan Balraj, Nuremberg (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/670,471

(22) Filed: Mar. 27, 2015

(65) Prior Publication Data

US 2016/0286450 A1    Sep. 29, 2016

(51) Int. Cl.
| | |
|---|---|
| *G06F 15/16* | (2006.01) |
| *H04W 36/22* | (2009.01) |
| *H04W 76/02* | (2009.01) |
| *H04W 72/04* | (2009.01) |
| *H04W 72/08* | (2009.01) |
| *H04W 4/00* | (2009.01) |

(52) U.S. Cl.
CPC ............ *H04W 36/22* (2013.01); *H04W 4/008* (2013.01); *H04W 72/0413* (2013.01); *H04W 72/085* (2013.01); *H04W 76/023* (2013.01)

(58) Field of Classification Search
CPC .. H04W 72/085; H04W 76/021; H04W 88/04; H04W 8/205; H04W 84/12
USPC ......... 455/436, 445, 570, 571; 370/315, 329
See application file for complete search history.

(56) References Cited

U.S. PATENT DOCUMENTS

| 2015/0223141 A1* | 8/2015 | Chatterjee ........... H04W 40/246 370/329 |
| 2015/0334757 A1 | 11/2015 | Seo |
| 2016/0088468 A1* | 3/2016 | Sharma ................ H04W 8/205 370/329 |

FOREIGN PATENT DOCUMENTS

| WO | 2012102546 A2 | 8/2012 |
| WO | 2014104627 A1 | 7/2014 |
| WO | 2015024505 A1 | 2/2015 |

OTHER PUBLICATIONS

3GPP R1-143374, On power control for D2D communication, Ericsson, 3GPP TSG-RAN WG1 Meeting #78, Dresden, Germany, Aug. 18-22, 2014, 4 pages.

(Continued)

*Primary Examiner* — Sam Bhattacharya
(74) *Attorney, Agent, or Firm* — Viering, Jentschura & Partner mbB

(57) ABSTRACT

A method for performing mobile communications from a first mobile terminal may include identifying one or more further mobile terminals engaged in device-to-device communications with the first mobile terminal. The method may further include selecting an intermediary mobile terminal from the one or more further mobile terminals, and transmitting mobile communication data from the first mobile terminal to the intermediary mobile terminal using direct device-to-device communications, wherein the mobile communication data is intended for transmission to a base station that is connected to the wireless communication network. The direct device-to-device communications may utilize wireless resources allocated by the network for transmission of cellular data from at least one mobile terminal to at least one base station.

20 Claims, 14 Drawing Sheets

(56) References Cited

OTHER PUBLICATIONS

3GPP TR 36.843 V12.0.1 (Mar. 2014), 3GPP Technical Specification Group Radio Access Network; Study on LTE Device to Device Proximity Services; Radio Aspects (Release12), 50 pages.
3GPP TR 23.703 V12.0.0 (Feb. 2014), 3GPP Technical Specification Group Services and System Aspects; Study on architecture enhancements to support Proximity-based Services (ProSe) (Release12), 324 pages.
3GPP TR 22.803 V12.2.0 (Jun. 2013), 3GPP Technical Specification Group Services and System Aspects; Feasibility study for Proximity Services (ProSe) (Release12), 45 pages.
Lee et al.: "Generalized co-phasing for multiple transmit and receive antennas," IEEE Trans. Wireless Comm., vol. 8, No. 4, pp. 1649-1654, Apr. 2009.
Extended European Search Report received for corresponding EP Patent Application No. 16155783.0 dated Jul. 27, 2016.

* cited by examiner

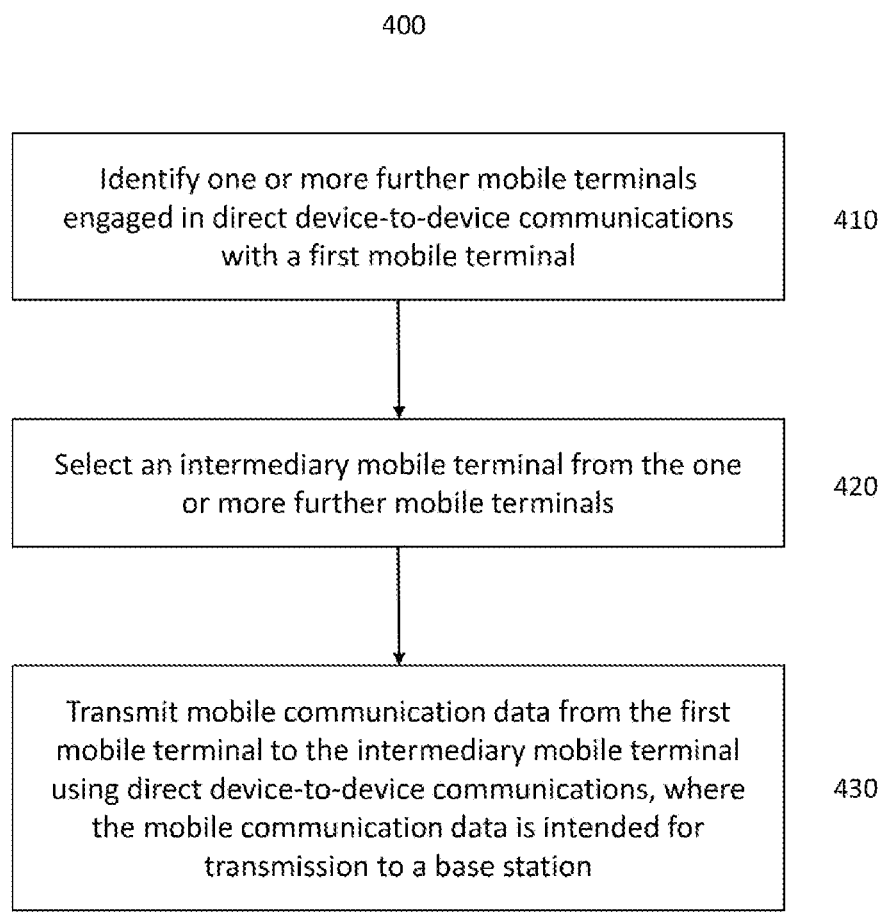

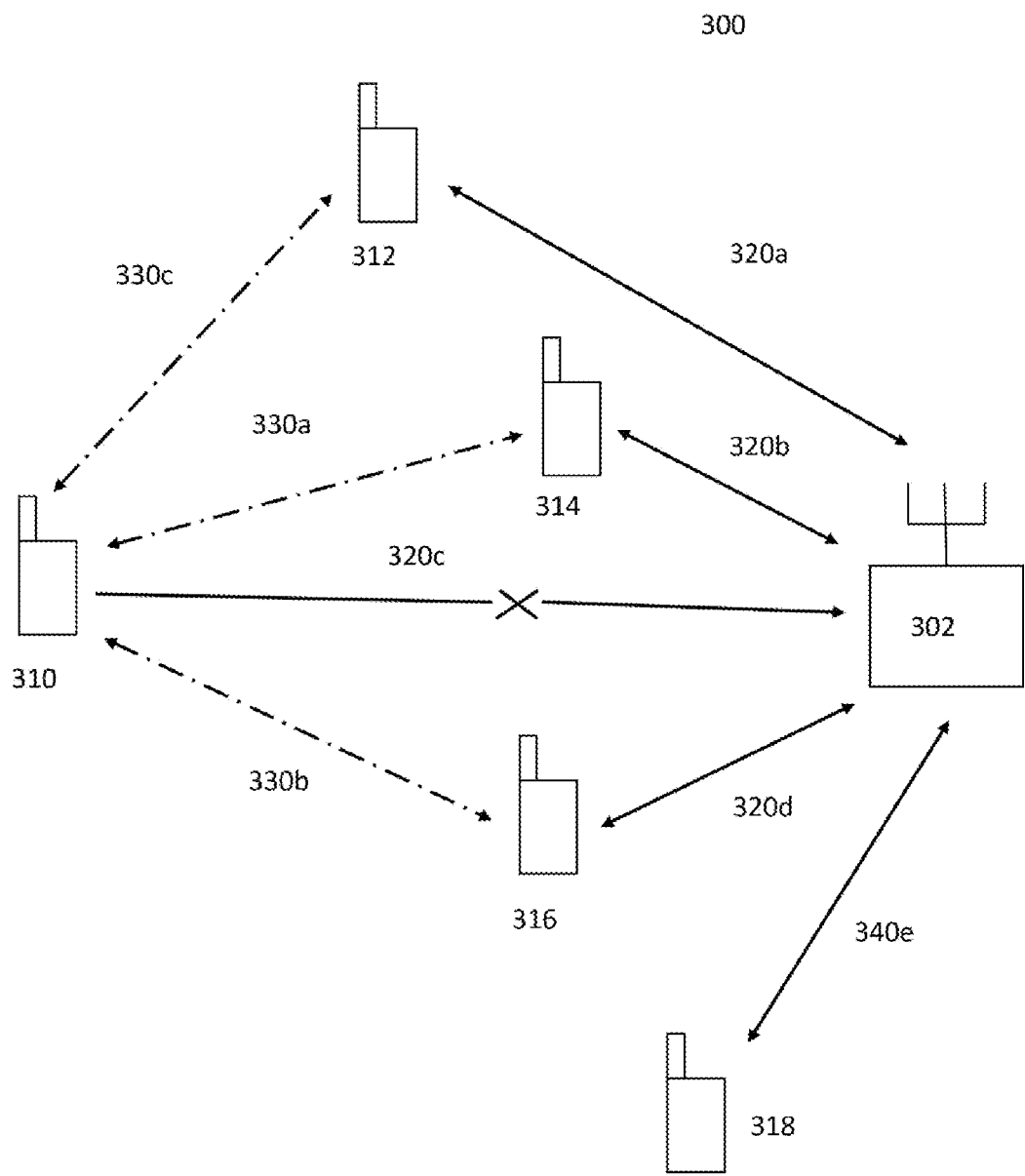

METHOD FOR PERFORMING MOBILE COMMUNICATIONS AND MOBILE RADIO COMMUNICATION TERMINAL DEVICE

TECHNICAL FIELD

Various aspects of this disclosure relate generally to methods of establishing intermediary communication paths to transmit Proximity Services (ProSe) data between a ProSe-capable mobile terminal and a network using device to device communications.

BACKGROUND

Proximity Services (also known as ProSe), are included in mobile communication standards, such as Release 12 of the $3^{rd}$ Generation Partnership Project (3GPP) Long Term Evolution (LTE) standard. Also known as D2D (Device to Device), ProSe allows mobile terminals to directly exchange wireless information with one another using licensed uplink channels. While base stations and other network components may still be utilized to coordinate the allocation of cellular resources for ProSe, the traffic-carrying requirements of such components may be substantially reduced. In addition to this reduced network load, exploiting direct communication between devices may improve spectrum utilization, overall throughput, and energy consumption. Numerous ProSe-specific applications are also possible, such as in a variety of new peer-to-peer and proximity-based services.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 4 shows a method for performing mobile communications according to an aspect of the disclosure;

FIG. 5 shows an exemplary mobile communication network according to another aspect of disclosure;

DESCRIPTION

Figure 1:
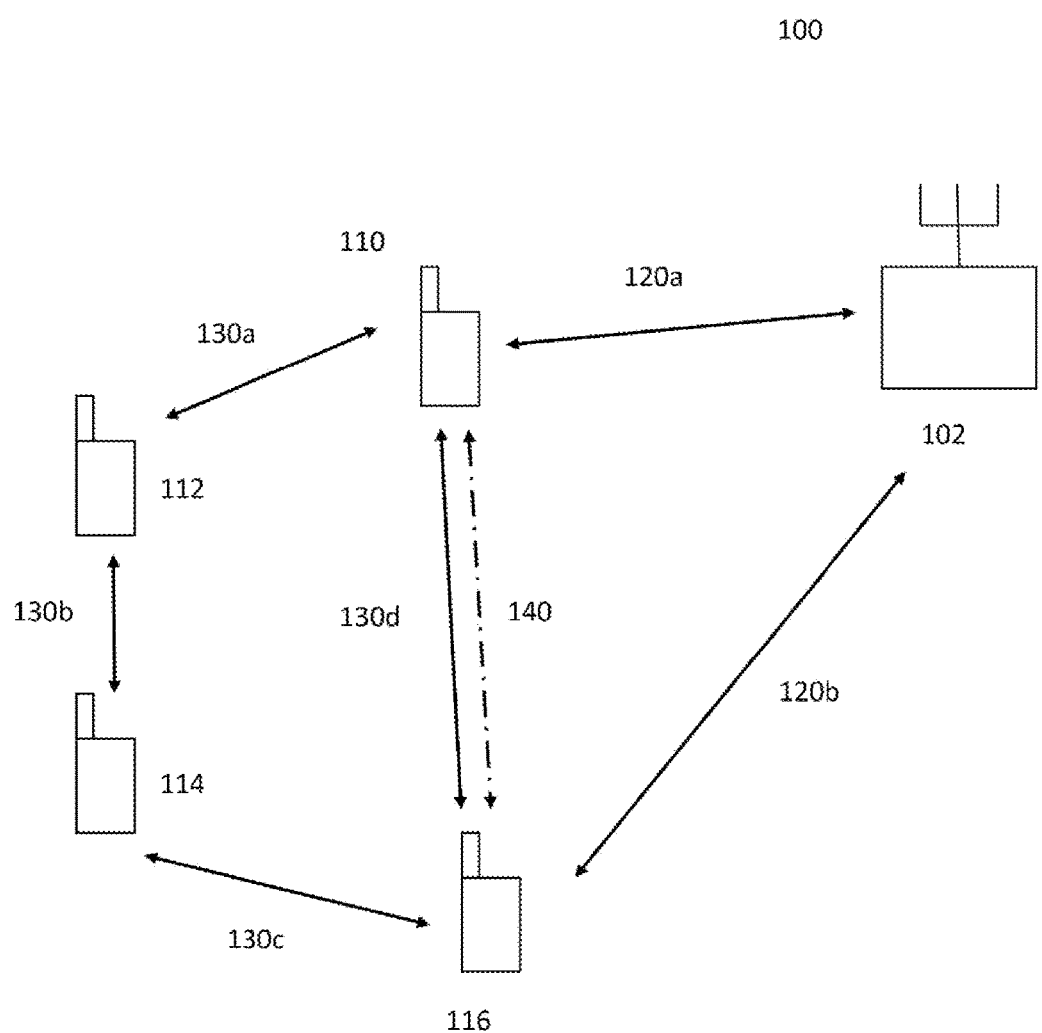
FIG. 1 shows an exemplary cellular mobile communication network.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

Long Term Evolution (LTE) Device to Device Proximity Services (ProSe, also known as Device to Device or "D2D") were introduced in LTE Release 12 by the $3^{rd}$ Generation Partnership Project (3GPP). This mobile communication protocol allows direct communications between mobile devices with only minimal requirements on network components. As opposed to the relatively high traffic-bearing responsibilities of base stations and other network components in conventional cellular communications, the network infrastructure takes on a largely managerial role in ProSe operations. While base stations are tasked with granting ProSe requests by mobile terminals as well as allocating cellular resources for ProSe communications, ProSe protocol no longer require base stations to act as hubs for cellular data traffic between ProSe enabled devices. This reduced load on network infrastructure offers a variety of benefits, such as improved spectrum utilization, improved overall data throughput, and reduced overall energy consumption. The ability for devices to directly exchange data in ProSe additionally offers benefits for users located far from serving base stations as well as those served by a busy base station. In addition to the advantages related to the effectiveness of wireless communication networks, ProSe has also made possible a vast array of new peer-to-peer and proximity based applications and services.

Mobile communication standards, such as 3GPP LTE Release 12, currently specify the re-use of dedicated uplink channels for ProSe transmissions. In other words, uplink carrier frequencies in the case of Frequency Division Duplex (FDD) and uplink subframes in the case of Time Division Duplex (TDD) are shared between conventional cellular communications and ProSe signaling. Accordingly, devices engaged in ProSe transmissions utilize a similar physical channel for ProSe (i.e. Physical Sidelink Shared Channel/ "PSSCH") as devices performing conventional cellular uplink communications with base stations (i.e. Phyical Uplink Shared Channel/"PUSCH"). Even though ProSe transmissions use a different physical resource block (PRB) than cellular transmissions, ProSe transmissions may still interfere with cellular transmissions due to the effects of in-band emission, such as on the PUSCH or Physical Uplink Control Channel ("PUCCH") as utilized for conventional uplink cellular transmissions. The current 3GPP LTE standard therefore includes protocols that implement ProSe Transmit Power Control (TPC) in order to effectively manage the levels of interference generated by ProSe transmissions on cellular communications. As will be described later, ProSe TPC may result in degraded performance of ProSe operations which are not addressed in the current mobile communication standards.

As specified by 3GPP in LTE Release 12, ProSe focuses mainly on public safety networks supporting "one to many communications", i.e. a group of more than two ProSe connected devices in which one device supplies information over ProSe communication links to a plurality of connected devices. These ProSe links are intended to provide direct device-to-device communication services for devices separated by up to 500 meters, although this distance is dependent on factors such as propagation conditions, throughput, and network load. The "proximity" of two devices necessary to support ProSe communications can thus be determined based on channel conditions, signal-to-interference-plus-noise (SINR) ratio, throughput, delay, density, and network load.

There exist several possible ProSe architectures. FIG. 1 shows mobile communication network 100, which includes base station 102 and mobile terminals 110, 112, 114, and 116. Mobile communication network 100 may be e.g. an LTE network, and accordingly base station 102 may be an evolved NodeB (eNodeB). Mobile terminals 110, 112, 114, and 116 may accordingly be LTE enabled devices.

One or more of the mobile terminals 110-116 may be engaged in conventional cellular communications with network components, such as e.g. base station 102. For example, one or more of mobile terminals 110-116 may receive downlink data such as voice or data signals from base station 102, and may correspondingly transmit uplink data to base station 102. The wireless resources utilized for these communications, such as carrier frequencies and subframes, may be allocated by the underlying cellular network for cellular communications.

In addition to cellular communications, one or more of mobile terminals 110-116 may have ProSe capabilities. In other words, one or more of mobile terminals 110-116 may be configured to engage in ProSe communications. Accordingly, one or more of mobile terminals 110-116 may be engaged in communications using ProSe protocols with another of mobile terminals 110-116. As previously detailed, ProSe communications may re-use the same wireless resources as allocated for cellular uplink communications, i.e. cellular transmissions from a mobile terminal to a base station or other network component. The ProSe signaling as will be further described may thus re-use the same carrier frequencies and/or timing subframes with mobile terminals performing uplink cellular transmissions. The allocation of these resources is managed by the underlying wireless network.

As shown in FIG. 1, ProSe Discovery links 130a-130d may be utilized by one or more of mobile terminals 110-116 to initiate ProSe Discovery with another one of mobile terminals 110-116 that is also ProSe-capable. ProSe Discovery links 130a-130d may be classified as ProSe Downlink communication links, which herein refer to ProSe signaling links from sent from one mobile terminal to another mobile terminal. As specified by 3GPP, ProSe Discovery is a process that identifies that a UE is in proximity of another UE. ProSe Discovery uses the existing evolved UMTS Terrestrial Radio Access Network (e-UTRAN) in order to enable a mobile device to discover other ProSe enabled devices in its proximity. If permitted, ProSe Discovery may also enable mobile devices to discover certain information about other proximate ProSe devices. ProSe Discovery may thus be classified in two main groups based upon this permission known as restricted discovery and open discovery. The use of ProSe Discovery must be authorized by the operator, e.g. the supporting mobile communication network, and the authorization can be on either a "per mobile terminal" basis or a "per mobile terminal per application" basis. An authorized application (e.g. a mobile application on a mobile terminal) can interact with the ProSe Discovery feature to request the use of certain ProSe Discovery preferences. The network controls the use of E-UTRAN resources, such as physical channels, used for ProSe Discovery for ProSe enabled mobile terminals.

Due to the managerial role that the mobile communication network plays in ProSe communications, a ProSe-dedicated link may need to be maintained between a mobile terminal and the mobile communication network in order to support ProSe communications. ProSe-engaged mobile terminals may perform ProSe Uplink communications to a serving base station. ProSe Uplink communications herein refers to communications between a mobile terminal and a base station using wireless resources specifically allocated for ProSe signaling. These ProSe Uplink communications may be used for a variety of features, such as ProSe Discovery requests, resource allocation, control signaling, etc.

ProSe Uplink communication links 120a and 120b may accordingly be used to transmit data from mobile terminals 116 and 110 to base station 102. This data may be ProSe-specific information, such as e.g. ProSe Discovery requests or other ProSe control information intended for base station 102. As previously detailed, ProSe Discovery may require authorization from the network, and thus ProSe Uplink communication links 120a and 120b may be essential for obtaining authorization from the network to initialize ProSe Discovery and other ProSe functionalities.

ProSe Discovery may be used as a standalone process, and accordingly may not lead to further usage of ProSe protocols such as ProSe Communication (which will be discussed later). ProSe Discovery alternatively may be used to initialize ProSe Communication.

Accordingly, mobile terminals 110-116 may use ProSe Discovery links 130a-130d in order to identify which other mobile terminals are in proximity, and to potentially initiate other communication services with proximate devices.

The ProSe architecture shown in FIG. 1 is known as an LTE Direct architecture, and accordingly ProSe-enabled devices may exchange information directly through the use of network-allocated E-UTRAN resources. Accordingly, one or more of mobile terminals 110-116 may have a direct ProSe link between each other to exchange data (e.g., a ProSe Downlink communication link). As shown in FIG. 1, mobile terminals 110 and 116 may be connected via ProSe Communication link 140. ProSe Communication links are communication paths between two mobile terminals in proximity by means of an E-UTRAN communication path established between the two mobile terminals. The term "ProSe Communication" herein refers to ProSe Communication as specified by 3GPP, while "ProSe communications" may refer to any type of ProSe signaling including ProSe Discovery and ProSe Communication. Similarly to ProSe Discovery links 130a-130d, ProSe Communication link 140 may also be characterized as a ProSe Downlink communication link as ProSe Communication links involve transmission directly from a ProSe-capable mobile terminal to another ProSe-capable mobile terminal.

FIG. 1 shows ProSe Communication link 140 established directly between mobile terminals 110 and 116. Alternatively, ProSe Communication paths may be routed between wireless devices such as Wireless Local Area Network (WLAN) devices (as will be later discussed). Accordingly, these ProSe Communication paths do not travel through macro base stations such as base station 102, hence reducing the overall traffic bearing responsibility of a mobile communication network such as mobile communication network 100.

Mobile terminals 110 and 116 may be connected via ProSe Communication link 140, and may use ProSe Communication link 140 to exchange a variety of information, such as e.g. voice and/or data. LTE Release 12 includes provisions related to the use of ProSe protocols for Public Safety Networks, in which ProSe connected devices may utilize ProSe to exchange data in emergency situations. Much of this public safety focused ProSe use utilizes broadcast communication in which a single ProSe enabled device broadcasts a message to many connected ProSe devices (i.e., "one to many" communications).

Figure 2:
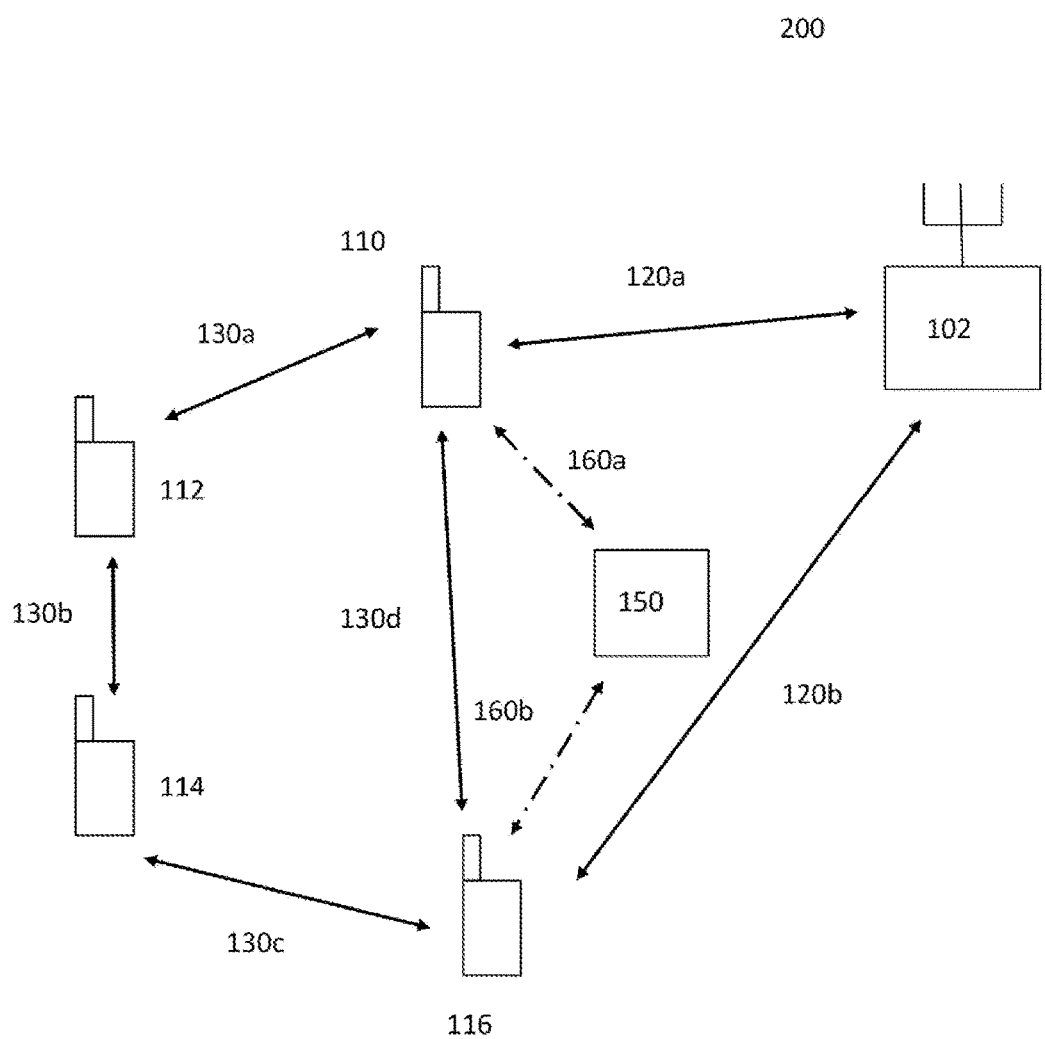
FIG. 2 shows an exemplary wireless LAN mobile communication network.

In addition to the LTE Direct ProSe architecture shown in FIG. 1, a WLAN Direct ProSe architecture is also possible. FIG. 2 shows mobile communication network 200, which implements a WLAN Direct ProSe architecture. Mobile communication network 200 contains many of the same components as mobile communication network 100, such as mobile terminals 110-116 and base station 102. While many of the communication links (such as e.g. ProSe Uplink communication links 120a and 120b and ProSe Discovery links 130a-130d), mobile communication network may include ProSe WLAN communication links 160a and 160b as opposed to ProSe Communication link 140. Mobile terminals 110 and 116 may accordingly exchange information using ProSe WLAN communication links 160a and 160b via WLAN device 150. Mobile terminals 110 and 116 therefore exchange data with the use of WLAN device 150 instead of via a direct connection such as ProSe Communication link 140 as in mobile communication network 100. This architecture is therefore known as a WLAN Direct ProSe architecture. Similarly to mobile communication network 100, mobile communication network 200 does not require the direct use of network components such as base station 102 in order to exchange information between mobile terminals 110 and 116.

As previously detailed, both ProSe Discovery and ProSe Communication operate on uplink carriers for frequency division duplexing (FDD) and using uplink subframes for time division duplexing (TDD). A similar physical channel (i.e. PSCCH) is utilized for both ProSe Communicaiton and ProSe Discovery as are used for conventional cellular communicaitons (i.e. PUSCH and PUCCH). Additionally, all data carrying physical channels use single carrier frequency division multiple-access for ProSe signaling.

Accordingly, ProSe operations utilize the same physical resources as conventional cellular uplink transmissions. While the allocation of these E-UTRAN uplink resources is allocated by the network to use different PRBs, interference between ProSe transmissions and cellular communications is still possible, and may result in the degradation of cellular communication quality. In other words, mobile terminals performing ProSe communications may produce interference on other users that are only utilizing conventional cellular communications. Accordingly, 3GPP has introduced the usage of ProSe TPC in order to effectively manage the level of interference on cellular communications caused by ProSe transmissions.

Conventional cellular TPC involves adjusting the uplink transmit power of mobile terminals in order to ensure that uplink transmissions can be effectively received by the network. The network may accordingly increase the transmit power for users who are located remotely from a serving base station or are experiencing high path loss, thereby potentially facilitating better reception of uplink signals at the serving base station. Conversely, the network may decrease the transmit power for users who are located proximate to a base station or are experiencing low path loss in order to minimize interference inflected upon other users. Cellular TPC may accordingly assign users located proximate to base stations lower uplink transmit powers than users located far from base stations. The network determines the transmit power based on the path loss between a mobile terminal and base station as measuring the RSRP at the mobile terminal.

3GPP has also specified the usage of open loop TPC for ProSe signaling from a given mobile terminal, hereafter referred to as ProSe TPC. The transmit power given by ProSe TPC for ProSe transmissions from a mobile terminal is defined by $$P_{D2D} = \min\{P_{CMAX}, 10 \log_{10}(M_{D2D}) + P_{0\_D2D} + \alpha \cdot PL\} \text{ (dbm)} \quad (1),$$

where $P_{CMAX}$ is the maximum mobile terminal transmit power, $P_{0\_D2D}$ is a mobile terminal specific parameter, $M_{D2D}$ is the number of assigned PRBs, $\alpha$ is the cell-specific path-loss compensation factors, and PL is the downlink path-loss measured at the mobile terminal. Open loop TCP is meant to compensate for slow variations of a received signal, i.e. path-gain plus shadowing. The parameters $P_{0\_D2D}$ and $\alpha$ are the same for all cells and are signaled from a base station to mobile terminals as broadcast information. The path-loss PL is measured at the mobile terminal based on the measured reference symbol receive power (RSRP).

ProSe TPC dictates the transmit power used for all ProSe transmissions from a mobile terminal, which includes both ProSe transmissions to other mobile terminals (referred to herein as ProSe Downlink communications) and ProSe transmissions from a mobile terminal to a serving base station (referred to herein as ProSe Uplink communications). Both ProSe Downlink communications and ProSe Uplink communications utilize wireless resources that the network has specifically allocated for ProSe signaling, which may additionally be utilized for conventional cellular transmissions from a mobile terminal to a base station. As detailed above, ProSe TPC is based on the path loss from a ProSe-capable mobile terminal and a base station, and is not based on the pass loss from a mobile terminal to another mobile terminal. ProSe-capable mobile terminals that are remotely located from a base station, or are experiencing high path loss due any number of reasons, may therefore be assigned a higher ProSe transmit power than mobile terminals that are located proximate to a base station. The assigned ProSe transmit power as dictated by ProSe TPC may therefore be directly correlated with the distance between a mobile terminal and a serving base station. The ability of ProSe-capable mobile terminals proximate to a base station to discover nearby ProSe-capable mobile terminals may consequently suffer due to the reduced ProSe signaling transmit power.

While ProSe TPC relates directly to the transmit power of ProSe signaling, there may additionally be unintended consequences on cellular communications. As earlier detailed, ProSe signaling may interfere with uplink transmissions from proximate cellular mobile terminals, i.e. those engaged in conventional uplink transmissions with a serving base station. 3GPP has therefore included the use of ProSe TPC in order to limit the effects of ProSe-based interference on conventional cellular transmissions. Due to the high priority given to cellular users, the cellular network may use ProSe TPC to reduce the transmit power of a ProSe-engaged device that is interfering with the cellular transmissions of another cellular device. Accordingly, a ProSe-engaged device may see a reduction in transmit power for all ProSe communications, including both ProSe Downlink transmissions (i.e. to other ProSe-capable devices) and ProSe Uplink transmissions (i.e. to a serving base station). The reduction in transmit power may be significant enough to render ProSe Uplink transmissions ineffective, and a ProSe-capable mobile terminal may thus not be able to complete ProSe Uplink transmissions. This loss of a ProSe Uplink channel to the communication network may substantially reduce the ProSe applications a mobile terminal is able to perform.

One such application is ProSe Discovery, which requires network permission. While a ProSe capable terminal with reduced power due to TPC, hereafter referred to as a "low power mobile terminal", may be able to maintain existing ProSe Communication sessions, it may no longer be able to send ProSe Discovery requests to the network. Consequently, a low power mobile terminal may be unable to notify the network of the results of any ProSe Discovery signaling by a low power mobile terminal, i.e. if the low power mobile terminal has identified any proximate ProSe-capable devices. These low power mobile terminals may consequently be prohibited from initiating new ProSe sessions with nearby ProSe enabled devices.

One such application is ProSe Discovery, which requires network permission and consequently may not be possible if a ProSe Uplink channel is lost. Low power mobile terminals may not be able to initiate any further ProSe sessions with other mobile devices. However, a low power mobile terminal may still be located sufficiently close to proximate mobile terminals in order to maintain any previously established ProSe Communication sessions. In other words, a low power mobile terminal may have existing ProSe Communication sessions with other proximately located mobile terminals. While the ProSe transmit power may be insufficient to reach a base station, it may still be significant enough to continue communications using ProSe Communication with the previously connected mobile terminals. Accordingly, a low power mobile terminal may be able to maintain existing ProSe Communication sessions despite being unable to initiate new ProSe sessions (due to the lack of a ProSe Uplink channel with which to request network permission).

In addition to a reduction in available ProSe protocols, numerous other procedures may be unavailable following the loss of a ProSe Uplink channel. For example, it may be possible for the network to arrange adjustments in transmissions by an interfering mobile terminal (for both cellular and ProSe transmissions) in order to reduce the generated level of interference on nearby cellular users. A reduction in interference on cellular users may allow the network to increase ProSe transmit power during the next period of ProSeTPC. However, the management of these adjustments to improve interference levels may require a communication with the network over dedicated ProSe resources, which will be unavailable due to the lack of a ProSe Uplink channel.

Previously established ProSe Communication sessions with other ProSe-enabled terminals may provide a solution to this problem for low power mobile terminals that have lost ProSe Uplink capabilities with the network. For example, a low power mobile terminal may remain connected via ProSe Communication with one or more devices that are connected to the network. In other words, a first low power mobile terminal may be connected with one or more mobile terminals that have sufficient ProSe transmit power to complete ProSe Uplink transmissions to a serving base station, and therefore may have an active ProSe Uplink connection to the network. Existing ProSe Communication links with these devices having active ProSe Uplink channels to the network may facilitate the re-establishment of a ProSe Uplink path from a low power mobile terminal and the network through one of the connected ProSe-enabled devices.

Figure 3A:
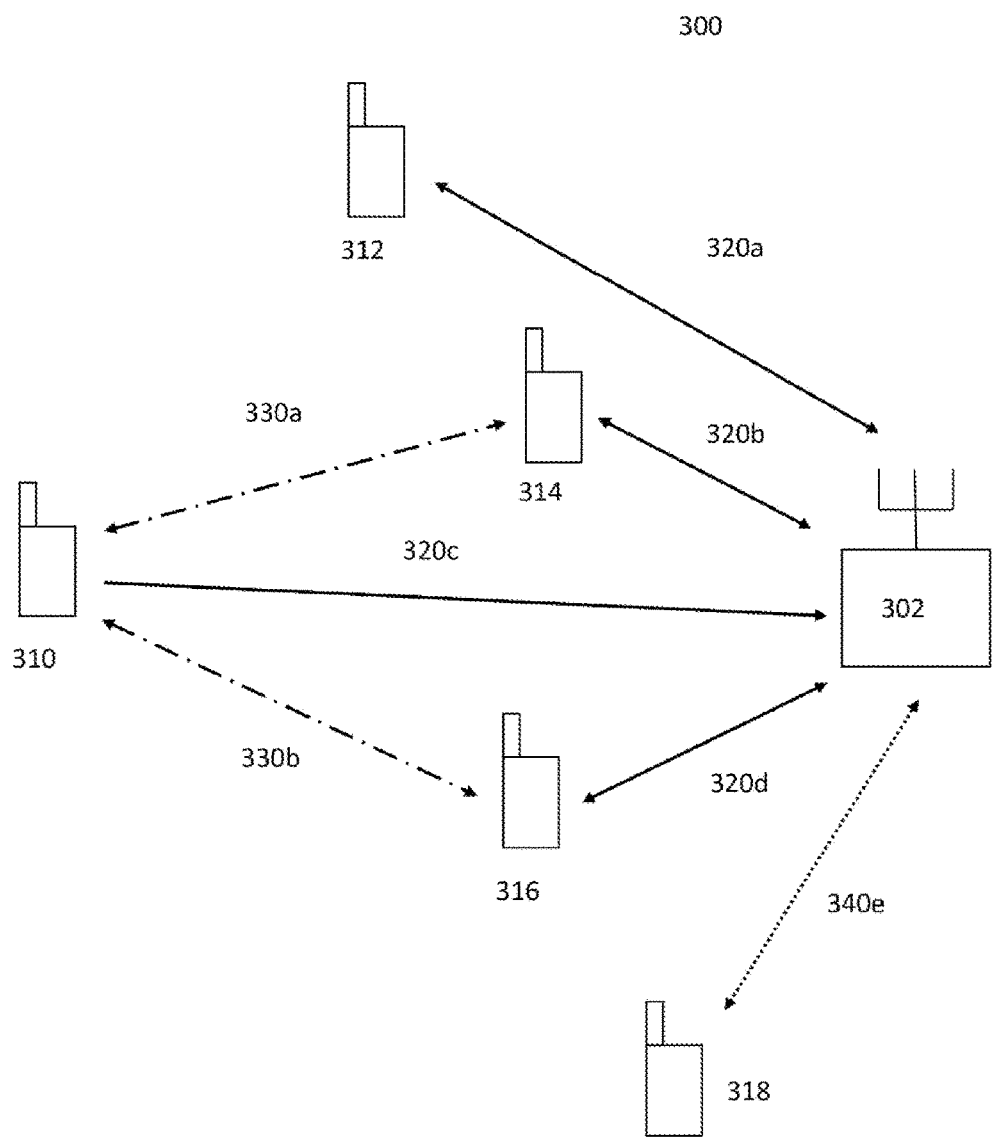
FIGS. 3A-3B show an exemplary mobile communication network according to an aspect of the disclosure.

FIG. 3A shows mobile communication network 300. Mobile communication network 300 may include base station 302, mobile terminals 310, 312, 314, 316, and 318. Mobile terminals 310, 314, and 316 may be ProSe capable devices, and may have a number of ProSe Uplink and ProSe Downlink connections. As shown in FIG. 3A, mobile terminal 310 may have active ProSe Communication links 330a and 330b (i.e. ProSe Downlink communication links) with mobile terminals 314 and 316. Mobile terminal 310 may utilize ProSe Communication links 330a and 330b to directly exchange information with mobile terminals 314 and 316 using ProSe Protocols.

Mobile terminals 310, 314, and 316 may additionally have ProSe Uplink connections 320b, 320c, and 320d, respectively (i.e. a communication path from a mobile terminal to a base station utilizing wireless resources specifically allocated for ProSe Communications). Mobile terminals 310, 314, and 316 may use ProSe Uplink communication links 320b-320d to maintain communication with the network in order to appropriately manage ProSe communications. For example, mobile terminals 310, 314, and 316 may use ProSe Uplink communication links 320b-320d to send ProSe Discovery requests, i.e. request to perform ProSe Discovery in order to discover proximate ProSe-capable devices. Mobile terminals 310, 314, and 316 may also use ProSe Uplink communication links 320b-320d for a variety of control signaling.

As shown in FIG. 3A, mobile terminal 310 may be located remotely from base station 302, and accordingly may require a high ProSe transmit power in order to successfully transmit ProSe signals to base station 302 over ProSe Uplink communication path 320c. This high ProSe transmit power may be controlled by ProSe TPC as performed by the network, and as previously detailed may be based on the path-loss measured from base station 302 to mobile terminal 310 according to Equation 1. Recall that the same ProSe transmit power is utilized for both ProSe Downlink communications (i.e., to other ProSe mobile terminals) and ProSe Uplink communications (i.e., to base stations), and accordingly mobile terminals 310 may transmit to both of ProSe-connected mobile terminals 314 and 316 in addition to base station 302 using the same high ProSe transmit power.

Mobile terminal 318 may additionally be communicating with base station 302 using conventional cellular uplink protocols. As shown in FIG. 3A, mobile terminal 318 may be transmitting uplink data to base station 302 over cellular communication path 340e. Cellular communication path 340 may be a conventional cellular path, i.e. using wireless resources allocated for conventional mobile communication information such as voice and data. Note that mobile terminals 310-316 may additionally have active conventional cellular uplink path with base station 302 (or alternatively another base station), although these communication paths are not explicitly shown in FIG. 3A.

Due to the shared utilization of E-UTRAN uplink resources for ProSe signaling, ProSe transmissions by mobile terminal 310 may generate high levels of interference with the conventional cellular uplink communications between mobile terminal 318 and base station 302. The cellular network may accordingly reduce the ProSe transmit power of mobile terminal 310 with ProSe TPC upon identifying mobile terminal 310 as the source of interference upon the conventional cellular uplink transmissions of mobile station 318. This reduction in ProSe transmit power of mobile terminal 310 may reduce the interference caused by mobile terminal 310 on mobile terminal 318.

Figure 3B:
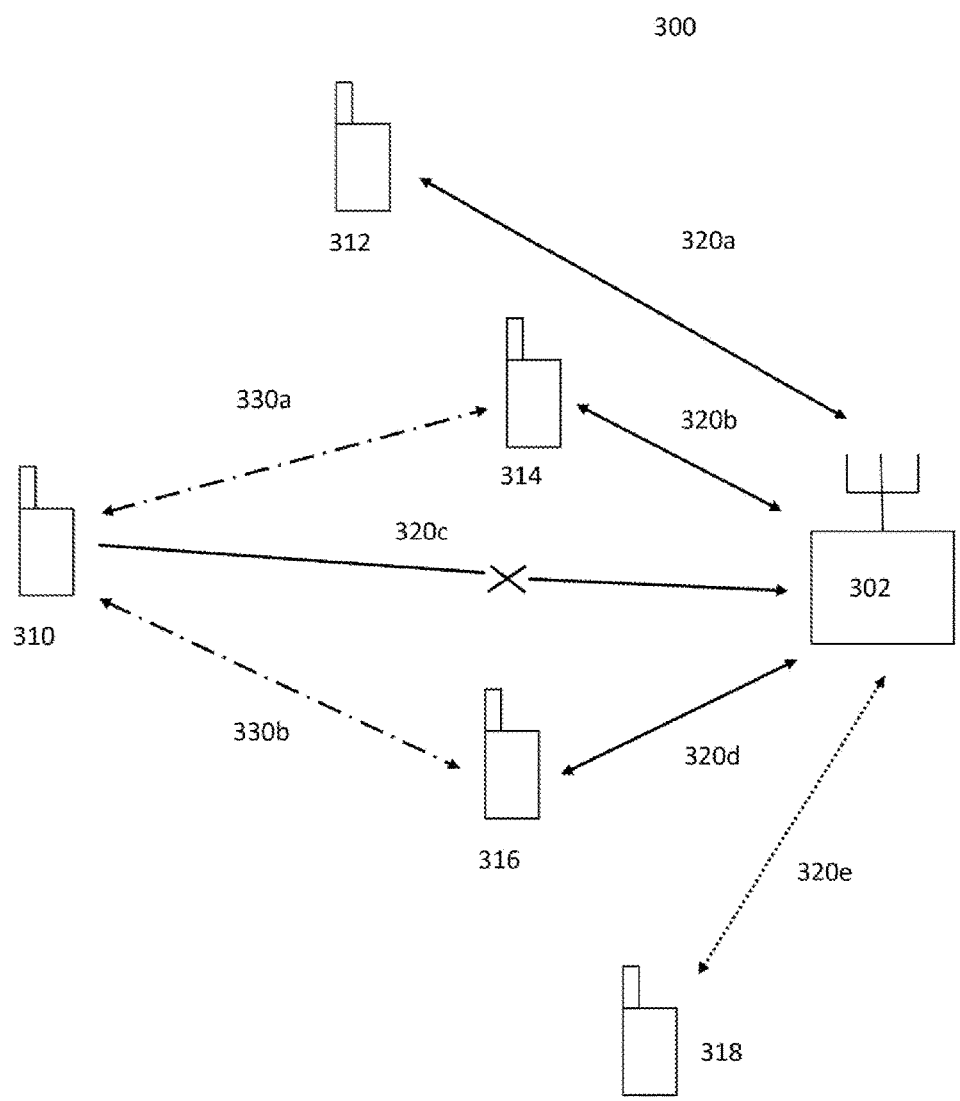

As a result, the ProSe transmit power of mobile terminal 310 may be reduced to such a level that ProSe Uplink communications with base station 302 over ProSe Uplink communication link 320c may no longer be possible. Accordingly, mobile terminal 310 may no longer be able to transmit ProSe information to base station 302. As shown in FIG. 3B, ProSe Uplink communication link 320c may be disabled.

As previously detailed, ProSe Discovery may require authorization from the network. Mobile terminal 310 may consequently no longer be able to perform ProSe Discovery due to the inability to send ProSe Discovery requests to the network through base station 302.

Mobile terminal 312 may also be located proximate to mobile terminal 310, and may request permission to engage in ProSe communications with nearby devices from base station 302 over cellular communication link 320a. While mobile terminal 310 may be located proximate to mobile terminal 312, mobile terminal 310 will not be able to request ProSe Discovery from the network due to the loss of a ProSe Uplink channel through ProSe Uplink communication link 320c. Consequently, mobile terminal 310 will not be able to request or perform ProSe Discovery or establish a ProSe Communication session with mobile terminal 312.

Despite the loss of ProSe Uplink communication link 320c to base station 302, mobile terminal 310 may maintain previously established ProSe Communication sessions. As shown in FIG. 3B, mobile terminal 310 may be engaged in ProSe Communication with mobile terminals 314 and 316 over ProSe Communication links 330a and 330b. The ProSe transmit power of mobile terminal 310 may therefore be sufficient enough to maintain ProSe Communications with mobile terminals 314 and 316, and any active ProSe Communication sessions may continue uninterrupted.

Mobile terminal 310 may utilize these existing ProSe Communication sessions in order to re-establish a ProSe Uplink channel to base station 302, and as a result may regain the capability to request further ProSe sessions as well as exchange a variety of data over the newly established ProSe Uplink channel.

In order to re-establish a ProSe Uplink channel with the network, mobile terminal 310 may establish an intermediary channel using one of ProSe connected mobile terminals 314 or 316. As shown in FIG. 3B, mobile terminals 314 and 316 may both have an active ProSe Uplink channel to base station 302 through ProSe Uplink communication links 320b and 320d. Accordingly, mobile terminal 310 may select one of mobile terminals 314 or 316 to act as an intermediary mobile terminal, and utilize the selected mobile terminal in order to send ProSe Uplink data to base station 302. In an exemplary scenario, this intermediary channel may be utilized to send ProSe Discovery requests from mobile terminal 310 to base station 302 utilizing ProSe-allocated wireless resources, thereby allowing mobile terminal 310 to initiate new ProSe Discovery and Communication sessions. This intermediary channel may additionally be used to exchange a variety of data with base station 302, including transmission adjustment parameters intended to adjust the ProSe transmissions of mobile terminal 310 in order to reduce interference on another cellular mobile terminal such as mobile terminal 318.

After selecting one of mobile terminals 314 or 316, mobile terminal 310 may utilize either existing ProSe Communication link 330a or 330b (dependent respectively on the selection of mobile terminal 314 or 316) to send data intended for base station 302 to the selected mobile terminal. For example, mobile terminal 310 may send data intended for base station 302 using ProSe protocols over one of ProSe Communication links 330a or 330b. The selected mobile terminal may then utilize one of active ProSe Uplink communication links 320b or 320d (dependent respectively on the selection of mobile terminal 314 or 316) to forward the data to base station 302.

Mobile terminal 310 may therefore identify one or more further mobile terminals (e.g. mobile terminals 314 and 316) that are engaged in direct device-to-device communications (e.g. ProSe Communication) with mobile terminal 310. The one or more further mobile terminals 314 and 316 may be engaged in wireless communications with a wireless communication network using wireless resources that are dedicated device-to-device communications. For example, mobile terminals 314 and 316 may be connected to base station 302 through ProSe Uplink communication links 320b and 320d, respectively. Mobile terminals 314 and 316 may be configured to exchange a variety of data including ProSe-related data with base station 302, including ProSe Discovery and ProSe communication data. Base station 302 may be a network component connected to core network infrastructure, and accordingly mobile terminals 314 and 316 may be connected to the underlying network through base station 302.

Mobile terminal 310 may be engaged in ProSe signaling with more or fewer mobile terminals than mobile terminals 314 and 316. For example, mobile terminal 310 may be connected to only a single mobile terminal with ProSe protocols, such as e.g. mobile terminal 314. Alternatively, mobile terminal 310 may be connected to more than two mobile terminals with ProSe signaling.

In order to establish an intermediary channel with base station 302, mobile terminal 310 may select an intermediary mobile terminal from the one or more further mobile terminals 314 and 316. As will be described later, mobile terminal 310 may select the intermediary mobile terminal based on an analysis of the active ProSe signaling links that mobile terminal 310 has with the one or more further mobile terminals 314 and 316.

After selecting an intermediary mobile terminal from the one or more further mobile terminals 314 and 316, mobile terminal 316 may transmit mobile communication data over an intermediary communication path that includes the selected intermediary mobile terminal. For example, mobile terminal 316 may transmit mobile communication data directly to the selected intermediary mobile terminal. Mobile terminal 316 may transmit mobile communication data using direct device-to-device communications, i.e. using ProSe Communication. The direct device-to-device communications may utilize resources that are allocated by the wireless communication network for uplink cellular transmissions. In other words, the direct device-to-device communications may be performed using the same carrier channels and/or transmission timing frames as used for conventional uplink cellular transmissions, i.e. transmissions from mobile terminals to a base station. The communication data transmitted by mobile terminal 310 may be intended for transmission to a base station that is connected to the wireless transmission network that the one or more further mobile terminals 314 and 316 are connected to.

For example, mobile terminal 310 may select mobile terminal 314 from the one or more further mobile terminals 314 and 316 as the intermediary mobile terminal. Mobile terminal 310 may then transmit mobile communication data over an intermediary communication path that includes the intermediary mobile terminal 314. Mobile terminal 310 may transmit the mobile communication data to intermediary mobile terminal 314 using direct device-to-device communications. The mobile communication data may be intended for transmission to a base station that is connected to the wireless communication network that the one or more further mobile terminals 314 and 316 are connected to.

According to the example illustrated in FIG. 3B, mobile terminal 310 may transmit mobile communication data over ProSe communication link 330a to selected intermediary mobile terminal 314. Selected intermediary mobile terminal 314 may then transmit the mobile communication data to base station 302 over ProSe Uplink communication link 320b. The intermediary communication path may accordingly include ProSe communication link 330a and ProSe Uplink communication link 320b, which may be used to transmit mobile communication data from mobile terminal 310 to base station 302 through selected intermediary mobile terminal 314. Selected intermediary mobile terminal 314 may transmit the mobile communication data to base station 302 using ProSe protocols, e.g. over active ProSe Uplink communication link 320b. ProSe Uplink communication link 320b may solely use wireless resources that have been allocated by the wireless network for ProSe communications. Accordingly, these wireless resources may be shared with conventional cellular uplink transmissions, e.g. as specified by 3GPP.

In this manner, a ProSe Uplink channel may be re-established between mobile terminal 310 and base station 302. Recall that the initial ProSe Uplink channel was initially lost due to a reduction in ProSe transmit power of mobile terminal 310 as determined by ProSe TPC performed by the underlying cellular communication network. Mobile terminal 310 may accordingly resume ProSe Uplink communications with base station 302 using the newly established intermediary communication path of ProSe communication link 330a and ProSe Uplink communication link 320b through selected intermediary mobile terminal 314. This intermediary communication path may be used for a variety of operations that were not possible immediately following the loss of a conventional cellular uplink channel, as will be further described later.

FIG. 4 shows a method 400 that illustrates a method for performing mobile communications from a first mobile terminal according to an exemplary aspect of the disclosure.

Method 400 may be used to establish an intermediary ProSe Uplink mobile communication path from a low power mobile terminal through a previously established ProSe Communication link. Method 400 may include identifying one or more further mobile terminals engaged in direct device-to-device communications with the first mobile terminal in 410. As previously detailed, a mobile terminal with low transmit power may maintain existing ProSe Communication links with connected ProSe enabled devices. These ProSe Communication links may be maintained even if the ProSe transmit power for the low power mobile terminal is insufficient to complete ProSe Uplink transmissions to the wireless network through a base station. Accordingly, a mobile terminal may identify one or more of these ProSe-connected mobile terminals in 410. The one or more mobile terminals may be connected to the wireless network, such as e.g. connected a base station. The one or more mobile terminals may be connected to the base station through an active ProSe Uplink communication path.

In 420, the first mobile terminal may select an intermediary mobile terminal from the one or more further mobile terminals. The first mobile terminal may perform an analysis in order to perform the selection. For example, the first mobile terminal may evaluate the status of current ProSe Communication links in order to select a mobile terminal that will provide a strong communication link with the first mobile terminal.

After selecting an intermediary mobile terminal, in 430 method 400 may further include transmitting mobile communication data from the first mobile terminal over an intermediary communication path that includes the intermediary mobile terminal. The mobile terminal may transmit the mobile communication data to the intermediary mobile terminal using direct device-to-device communications. The uplink mobile communication data may be intended for transmission to a base station that is connected to the wireless communication network, i.e. the base station may be connected to the wireless communication network that the one or more further mobile terminals of 410 and 420 are also connected to. The mobile communication data may be e.g. ProSe Discovery data, such as a request to perform ProSe Discovery with proximate mobile terminals. The mobile communication data may be a variety of data types, such as further ProSe-related signal or ProSe transmission adjustment parameters configured to reduce ProSe-generated interference.

Method 400 may therefore be used to transmit mobile communication data from the first mobile terminal to a base station via an intermediary mobile terminal. The first mobile terminal may transmit the mobile communication data over an intermediary communication path that includes the intermediary mobile terminal. The first mobile terminal may transmit the mobile communication data to the selected intermediary mobile terminal using direct device-to-device communications. The direct device-to-device communications may utilize wireless resources that are allocated by the wireless network for direct device-to-device communications and uplink cellular transmissions.

The intermediary communication path may include at least one ProSe signaling link. For example, the intermediary communication path may include a ProSe Communication link between the first mobile terminal and the selected intermediary mobile terminal. Accordingly, the first mobile terminal may transmit the mobile communication data to the intermediary mobile terminal using ProSe Communication. The intermediary mobile terminal may then transmit the communication data to the base station, thereby completing a ProSe Uplink transmission from the first mobile terminal to the base station. A ProSe Uplink channel for the first mobile terminal to the cellular network may therefore be realized.

Method 400 may further include receiving one or more measured wireless signal characteristics at the first mobile terminal from at least one of the one or more further mobile terminals. The first mobile terminal may then select the intermediary mobile terminal from the one or more further mobile terminals based on the one or more measured wireless signal characteristics. The one or more measured wireless signal characteristics may be received over a device-to-device communication link.

Selecting the intermediary mobile terminal based on measured wireless signal characteristics received from the one or more further mobile terminals may allow the first mobile terminal to select an optimal mobile terminal as the intermediary mobile terminal. For example, some device-to-device links may be stronger and/or of higher quality than others. The first mobile terminal may therefore perform a quantitative analysis in order to select the one or more further mobile terminals that will provide the performance as the intermediary mobile terminal. This may facilitate a stronger intermediary ProSe Uplink channel, and accordingly may result in a higher level of communications between the first mobile terminal and the cellular network.

An example of measurement-based selection of the intermediary mobile terminal will now be described in relation to FIG. 3B. As previously detailed, mobile terminal 310 may have transmit power that is too low to support direct ProSe Uplink communications from mobile terminal 310 and base station 302. Therefore, mobile terminal 310 may not be able to complete ProSe Uplink transmissions to base station 302, and accordingly may not have an active ProSe Uplink connection to the cellular network. Mobile terminal 310 may accordingly be unable to send ProSe-related information to base station 302.

Mobile terminal 310 may still maintain ProSe Communication sessions with mobile terminals 314 and 316, which may have been previously authorized and initiated based on permission from the network. These ProSe communication sessions may take place over ProSe Communication links 330*a* and 330*b*.

Mobile terminal 310 may therefore select one of mobile terminals 314 or 316 as an intermediary mobile terminal to perform ProSe Uplink transmissions to base station 302 over the corresponding ProSe Communication link 330*a* or 330*b*. In order to select one of mobile terminals 314 or 316 as the intermediary mobile terminal, mobile terminal 310 may receive a measured wireless signal characteristic from both mobile terminals 314 and 316. Mobile terminal 310 may then select mobile terminal 314 or 316 as the intermediary mobile terminal based on the measured wireless signal characteristics.

Each of the measured wireless signal characteristics may be a reference signal receive power (RSRP) measurement. Mobile terminals 314 and 316 may perform RSRP measurements on ProSe signals received at mobile terminals 314 and 316 from mobile terminal 310. In other words, the RSRP measurements may be an RSRP measurement of ProSe signals received over ProSe Communication links 330*a* or 330*b*. The RSRP measurements may therefore be a quantitative representation of the quality of ProSe communication links 330*a* and 330*b* between mobile terminal 310 and each of mobile terminals 314 and 316.

Mobile terminal 310 may select either mobile terminal 314 or 316 as the intermediary mobile terminal based on the received RSRP measurements. In this manner, mobile terminal 310 may select the connected mobile terminal that will provide the highest quality intermediary ProSe Uplink channel to base station 302.

For example, mobile terminals 314 and 316 may periodically send RSRP measurements to mobile terminal 310 over ProSe communication links 330*a* and 330*b*. These RSRP measurements may be RSRP measurements of ProSe communication signals received at mobile terminals 314 and 316 from mobile terminal 310 over ProSe communication links 330*a* and 330*b*. In a situation where mobile terminal 310 needs to establish an intermediary ProSe Uplink channel, mobile terminal 310 may evaluate the received RSRP measurements in order to select either mobile terminal 314 or 316 as the intermediary mobile terminal.

Accordingly, method 400 may further include wherein each of the one or more measured wireless signal characteristics include a reference signal receive power (RSRP) measurement, and wherein the selecting an intermediary mobile terminal includes selecting an intermediary mobile terminal based on the RSRP measurements. Method 400 may further include wherein the selecting an intermediary mobile terminal includes selecting the further mobile terminal associated with a maximum-valued RSRP measurement as the intermediary mobile terminal. Method 400 may further include wherein the selecting an intermediary mobile terminal includes selecting the further mobile terminal associated with the highest RSRP measurement as the intermediary mobile terminal.

In other words, the first mobile terminal may select the mobile terminal that produced the highest RSRP measurement as the intermediary mobile terminal. For example, one of the one or more further mobile terminals may send an RSRP measurement that is higher-valued than the RSRP measurements sent by the other further mobile terminals. The first mobile terminal may select this mobile terminal as the intermediary mobile terminal for the intermediary communication link.

Method 400 may further include setting a transmit power for the first mobile terminal. As previously described regarding FIGS. 3A and 3B, the cellular network may perform ProSe TPC in order to determine an appropriate transmission power setting for ProSe-active mobile terminals.

Method 400 may include wherein the transmit power is based on a level of interference between device-to-device signaling of the first mobile terminal and cellular communications of a cellular mobile terminal connected to the wireless communication network. The transmit power may be determined based on transmit power control performed by the wireless communication network, such as e.g. ProSe transmit power control. The transmit power may be selected such that the level of interference between device-to-device signaling of the first mobile terminal and cellular communications of the cellular mobile terminal is reduced. The transmit power for the first mobile terminal may be set to a reduced transmit power level that is insufficient to support direct ProSe uplink transmissions between the first mobile terminal and the base station. The transmit power may be set to the reduced transmit power level before the one or more mobile terminals are identified in 410. The transmit power may be a transmit power for use in direct device-to-device communications, such as ProSe signaling.

As previously described regarding FIGS. 3A and 3B, the wireless communication network may perform transmit power control in order to reduce interference caused by ProSe communications on the cellular communications of cellular users. As a result, the first mobile terminal may be unable to successfully transmit ProSe Uplink communication data to the wireless network through a base station. The first mobile terminal may accordingly attempt to establish an intermediary communication link, such as e.g. by performing method 400.

Method 400 may further include wherein the mobile communication data of 430 includes a device-to-device discovery request. For example, the first mobile terminal may transmit a device-to-device discovery request over the intermediary communication link in order to request ProSe Discovery from the wireless network. As previously detailed, ProSe Discovery requires network permission, and accordingly the first mobile terminal may be unable to request ProSe discovery if no ProSe Uplink channel is present.

For example, mobile terminal 312 may notify the cellular network through base station 302 that mobile terminal 312 is available for ProSe operations. Mobile terminal 312 may be located proximate to mobile terminal 310, and accordingly may satisfy the proximity requirements for ProSe connections. However, mobile terminal 310 may be unable to request permission to perform ProSe Discovery from the network as the ProSe Uplink path of ProSe Uplink communication link 320c has been terminated due to a low ProSe transmit power setting for mobile terminal 310. Accordingly, mobile terminal 310 may be unable to perform ProSe Discovery, and consequently may be unable to engage in ProSe communications with mobile terminal 312.

In order to request ProSe Discovery, mobile terminal 310 may establish an intermediary ProSe Uplink communication path using mobile terminal 314 or 316 as an intermediary mobile terminal as previously described. Mobile terminal 310 may then send a Pro Se Discovery request to the cellular network over the intermediary communication path containing ProSe communication link 330a or 330b and ProSe Uplink communication link 320b or 320d (dependent respectively on the selection of either mobile terminal 314 or 316 as the intermediary mobile terminal).

Method 400 may therefore further include receiving a device-to-device discovery grant at the first mobile terminal. In other words, the first mobile terminal may receive permission to perform ProSe Discovery following the transmission of a ProSe Discovery request in 430 to the network using the newly established intermediary communication path. The ProSe Discovery grant may be received at the first mobile terminal from base station 302. This ProSe Discovery grant may be transmitted from base station 302 to mobile terminal 310 using ProSe-allocated resources.

Following the reception of a device-to-device discovery grant, method 400 may further include performing device-to-device discovery at the first mobile terminal. In other words, the first mobile terminal may perform ProSe Discovery after receiving authorization from the network to perform ProSe Discovery.

The ProSe Discovery grant may be first authorized by base station 302. Base station 302 may additionally allocate radio resources for ProSe Discovery, such as specific uplink carrier frequencies and/or uplink transmission subframes, and convey the assigned resources to mobile terminal 310 using radio resource control signaling over ProSe dedicated resources from base station 302 to mobile terminal 310.

Mobile terminal 310 may therefore perform ProSe Discovery after receiving the ProSe Discovery grant from base station 302. Mobile terminal 310 may then identify mobile terminal 312 during the ProSe Discovery process. As previously detailed, ProSe Discovery may include identifying proximate ProSe-enabled devices as well as, if permitted, obtaining certain information regarding the identified devices. Mobile terminal 312 may be identified in this manner by mobile terminal 310.

After identifying mobile terminal 312 through ProSe Discovery, mobile terminal 310 may decide to pursue ProSe Communications with mobile terminal 312 in order to directly exchange data. Accordingly, mobile terminal 310 may need to send a ProSe Communication request to the cellular network. Mobile terminal 310 may again use the established intermediary communication link (one of ProSe Communication links 330a or 330b in addition to one of ProSe Uplink communication links 320b or 320d, dependent upon the selection of either mobile terminal 314 or 316 as the intermediary mobile terminal) in order to transmit a ProSe Communication request to base station 302. The ProSe Communication request may include a request to the network to initiate ProSe Communications with mobile terminal 312, which may have been identified as part of the ProSe Discovery process performed by mobile terminal 310.

Accordingly, method 400 may further include wherein the performing device-to-device discovery includes identifying a target mobile terminal, and transmitting a device-to-device communication request over the intermediary communication link from the first mobile terminal. The device-to-device communication request may be intended for the base station, and may be transmitted to the base station via the selected intermediary mobile terminal. The device-to-device communication request may be transmitted to the base station from the selected intermediary mobile terminal using wireless resources specifically allocated for device-to-device communications. These wireless resources may overlap with wireless resources that are allocated to conventional cellular uplink communications, such as e.g. timing subframes and/or carrier frequencies. The device-to-device communication request may specifically request device-to-device communications with the target mobile terminal that was identified during device-to-device discovery.

After transmitting the device-to-device communication request, the first mobile terminal may receive a device-to-device communication grant. Method 400 may further include performing device-to-device communications between the first mobile terminal and the target mobile terminal, where the target mobile terminal was identified during device-to-device discovery. The device-to-device communication grant may include a grant to perform device-to-device communications with the target mobile terminal.

Mobile terminal 310 may therefore receive a ProSe Communication grant from the cellular network. Mobile terminal 310 may receive the ProSe Communication grant directly from base station 302 using wireless resources specifically allocated for ProSe protocols.

After receiving the ProSe Communication grant, mobile terminal 310 may perform ProSe Communications with the mobile terminal 312, which was identified during ProSe Discovery. This scenario is shown in FIG. 5, which includes the network structure of FIGS. 3A and 3B with the addition of ProSe Communication link 330c between mobile terminal 310 and mobile terminal 312. Mobile terminal 312 may have previously notified the network of desire to perform ProSe communications over ProSe Uplink communication link 320a.

The ProSe Communication grant may contain a grant to perform ProSe Communications with mobile terminal 312 in response to the ProSe Communication request previously transmitted over the intermediary communication link by mobile terminal 310. The intermediary ProSe Uplink path through the selected intermediary mobile terminal may therefore allow mobile terminal 310 to perform both ProSe Discovery and ProSe Communication even in the absence of a direct ProSe Uplink communication link between mobile terminal 310 and base station 302.

Further operations that otherwise require a direct ProSe Uplink channel from a ProSe-enabled mobile terminal to a base station may additionally be possible once an intermediary ProSe Uplink channel is established. For example, the intermediary ProSe Uplink channel may be utilized in order to organize adjustments in ProSe Uplink transmissions from the ProSe-enabled mobile terminal. These adjustments in ProSe Uplink transmissions may result in reduced interference between ProSe transmissions by the ProSe-enabled mobile terminal and cellular communications of a cellular terminal, thereby allowing an increase in ProSe transmit power for the mobile terminal.

For example, the intermediary ProSe Uplink channel may be utilized to manage a phase alignment process between transmissions by the ProSe-enabled mobile terminal and cellular communications of a cellular terminal that is suffering from interference caused by the ProSe-enabled mobile terminal. The interference may be reduced by selecting an appropriate phase difference between ProSe transmissions from the ProSe-enabled mobile terminal and the cellular terminal suffering from interference. This phase difference may be used to shift the phase of ProSe transmissions from the ProSe-enabled mobile terminal relative to wireless transmissions of the cellular mobile terminal. Selection of an appropriate phase difference may be performed by a network component such as a base station.

In a cellular system such as illustrated in FIGS. 3A and 3B, multiple mobile terminals (e.g. mobile terminals 312, 314, 316, 318, and 310) may be transmitting to a single base station (e.g. base station 302). Due to the fact that mobile terminal 310 is additionally engaged in ProSe Communications that utilize the same uplink resources as cellular communications, base station 302 may additionally receive ProSe Communication signals (i.e. signals intended for direct exchange between ProSe-connected mobile terminals) as uplink data in the form of interference. As previously detailed, these ProSe Communications may produce interference with cellular communications, such as e.g. interference caused by ProSe communications of mobile terminal 310 on cellular communications of mobile terminal 318.

The signal received at a base station in such a scenario with ProSe signaling as well as conventional cellular uplink transmissions by mobile terminals may be expressed as follows:

$$r = \sum_{m=1}^{M} h_e x_m + n \quad (2),$$

where the vector r is the received signal, M is the number of transmitting mobile terminals, $H_m$ is the channel matrix containing the channel information for each of the M transmitting mobile terminals, $e^{j\theta_m}$ is the steering vector for the $m^{th}$ transmitting mobile terminal, $x_m$ is the transmit data vector containing the data signal as transmitted by the $m^{th}$ transmitting mobile terminal, and n is the Additive White Gaussian Noise vector (AWGN) expressed as n CN(0, $N_0 I_{N_R}$). Equation 2 may also be expressed as:

$$r = \sum_{m=1}^{M} h_e x_m + n \quad (3),$$

where the equivalent channel matrix $h_e$ has been substituted for the expression $H_m e^{j\theta_m}$.

Interference between the M transmitting mobile terminals may be reduced by maximizing the signal-to-noise ration (SNR) at the base station (i.e., the SNR of the received signal r). Maximizing the SNR is equivalent to maximizing the Euclidean norm of the equivalent channel matrix $h_e$, which can be calculated as follows:

$$\|h_e\| = \sum_{m=1}^{M} \|h_m\|^2 + 2\sum_{m=1}^{M}\sum_{k=m+1}^{M} R\{e^{-j(\theta_m-\theta_k)} h_m^* h_k\} \quad (4),$$

where $R\{e^{-j(\theta_m-\theta_k)} h_m^* h_k\}$ represents the real part of $e^{-j(\theta_m-\theta_k)} h_m^* h_k$.

The phase $\theta_m$ for the $m^{th}$ transmitting mobile terminal is thus contained in the steering vector $e^{j\theta_m}$. For M>2, i.e. more than two transmitting mobile terminals, the solution of Equation 3 is not convex. Once ProSe transmission signals are included in addition to the existing cellular transmission signals, the complexity of Equation 4 increases dramatically based on the number of mobile terminals involved in ProSe signaling. Equation 4 therefore becomes practically unrealizable due to the dynamic distribution of ProSe signaling in mobile terminals.

However, the scenarios detailed above involving a single mobile terminal generating ProSe-related interference on another may still permit a feasible approach to solve Equation 4, thereby maximizing the SNR of signals received at a base station. As previously detailed regarding FIG. 3B, ProSe transmissions by mobile terminal 310 may be interfering with cellular transmissions of mobile terminal 318. Accordingly, Equation 4 may be solved by only considering M=2, i.e. the two mobile terminals 310 and 318. Accordingly, the SNR of signals received at base station 302 (as expressed by Equation 4) may be maximized by maximizing the term $$2\sum_{m=1}^{M}\sum_{k=m+1}^{M} R\{e^{-j(\theta_m-\theta_k)} h_m^* h_k\} \quad (5).$$

Equation 5 (with m=1 and k=2 in accordance with M=2) may in turn be maximized by maximizing $R\{e^{j(\theta_2-\theta_1)} h_1^* h_2\}$ (with respect to the cellular mobile terminal 318 associated with $\theta_1$ and $h_1^*$). This expression is accordingly determined only by the relative phase $(\theta_2-\theta_1)$. If $\theta_1=0$, the value for $\theta_2$ that yields maximum $R\{e^{j(\theta_2-\theta_1)} h_1^* h_2\}$ is given by $$\theta_2 = -\angle(h_1^* h_2) \quad (6),$$

where $\angle$ is the angular operator. Therefore, the value for $\theta_2$ (the new phase setting for the ProSe-engaged low power mobile terminal) may be determined relative to the value of $\theta_1$ (the phase setting for the cellular mobile terminal suffering from interference). Alternatively, if $\theta_1 \neq 0$, $\theta_2$ may be calculated as $$\theta_2 = -\angle(h_1^* h_2) + \theta_1 \quad (7).$$

Setting the phase $\theta_2$ for the ProSe-enabled mobile terminal (310 in FIG. 3B) according to Equation 6 may consequently maximize the SNR of desired signals received at base station 302 by reducing the level of interference caused by ProSe transmissions of mobile terminal 310 on cellular transmissions of cellular mobile terminal 318. A reduction in interference may in turn lead base station 302 to allow an increase in ProSe transmit power for mobile terminal 310, which may consequently yield a greater ProSe Discovery range for mobile terminal 310 as well as potentially allowing mobile terminal 310 to re-establish a direct ProSe Uplink channel to a base station, such as e.g. ProSe Uplink communication link 320c. Any increases in ProSe transmit power may be determined by ProSe TPC, during which the network may re-evaluate the level of interference caused by the interfering ProSe terminal on any afflicted cellular terminals. Low levels of detected interference may allow the network to increase the ProSe transmit power for the interfering ProSe terminal.

Mobile terminal 310 may therefore utilize an established intermediary communication link with one of ProSe-enabled mobile terminals 314 or 316 in order to facilitate the exchange of a transmission phase alignment with the network in accordance with the above-detailed equations. For example, mobile terminal 310 may utilize the intermediary communication link in order to send base station 302 the phase value $\theta_2$ that mobile terminal 310 is currently using for ProSe transmissions. As previously detailed, the phase value $\theta_2$ may be first sent to one of ProSe-enabled mobile terminals 314 or 316 over an established ProSe Communication link, such as e.g. one of ProSe Communication link 330a or 330b. The receiving mobile terminal 314 or 316 may then send base station the phase value $\theta_2$ using its corresponding ProSe Uplink communication link 320b or 320d.

The intermediary communication path may also be used to send channel state information (CSI) from mobile terminal 310 to base station 302. This CSI may be determined by mobile terminal 310 based on signals received at mobile terminal 310 by base station 302, such as e.g. ProSe signals transmitted from base station 302. Mobile terminal 310 may accordingly send feedback information detailing the wireless channel using the intermediary communication path, i.e. using an existing ProSe communication path (i.e. ProSe Downlink) with an intermediary mobile terminal subsequently followed by an active ProSe Uplink path that the intermediary mobile terminal has with a base station. Accordingly, the phase information $\theta_2$ of mobile terminal 302 may be sent along with this CSI, i.e. may be commonly transmitted along with CSI.

Base station 302 may also receive the phase value $\theta_1$ that mobile terminal 318 is using for uplink cellular transmissions. Base station 302 may then calculate a new phase value $\theta_2'$ for mobile terminal 310 to utilize for future ProSe transmissions.

Base station 302 may then send the new phase value $\theta_2'$ to mobile terminal 310. This transmission may additionally take place using ProSe-dedicated resources, which may accordingly also be shared with conventional cellular uplink transmissions. Mobile terminal 310 may then perform adjusted transmissions using the new phase setting $\theta_2'$. Accordingly, mobile terminal 310 may transmit ProSe Signals that are phase-shifted relative to cellular communications of mobile terminal 318, which was experiencing interference from the ProSe signaling of mobile terminal 310. Further transmissions from mobile terminals 310 and 318 may therefore be phase-aligned, and the level of interference between the signals may be reduced.

Reduced levels of interference between mobile terminal 310 and 318 may permit an increase in the ProSe transmit power of mobile terminal 310, which as previously described may have been reduced by base station 302 by ProSe TPC due to excessive interference between ProSe signaling and cellular communications of mobile terminal 318. Accordingly, base station 302 may subsequently perform ProSe TPC in order to adjust the ProSe transmit power of mobile terminal 310 based on the interference generated by transmitted ProSe signals. This period of ProSe TPC may therefore determine that ProSe signals transmitted by mobile terminal 310 are causing less interference on cellular transmissions of mobile terminal 318. Base station 302 may therefore permit mobile terminal 310 to utilize a higher ProSe transmit power, thereby increasing the ProSe Discovery range of mobile terminal 310 in addition to potentially restoring the ProSe transmit power of mobile terminal 310 to a level sufficient to re-establish a ProSe Uplink communication path between mobile terminal 310 and base station 302.

Accordingly, mobile terminal 310 may utilize an intermediary communication path through a ProSe-connected mobile terminal in order to facilitate phase alignment operations between mobile terminal 310 and another cellular mobile terminal. This may result in a reduction in interference caused by ProSe signals transmitted by mobile terminal 310, thereby increasing network performance as well as potentially allowing an increase in ProSe transmit power for mobile terminal 310.

Method 400 may therefore further include wherein the uplink communication data of 430 includes a first transmission configuration parameter. Method 400 may further include receiving a second transmission configuration parameter at the first mobile terminal, wherein the second transmissions configuration parameter is determined by the wireless communication network based on the first transmission configuration parameter.

Method 400 may additionally include performing adjusted wireless transmissions at the first mobile terminal based on the second configuration parameter. As detailed above, the first transmission configuration parameter may include an initial transmission phase setting of the first mobile terminal, and the second transmission configuration parameter may include a new device-to-device transmission phase setting of the first mobile terminal. The transmission phase settings may be a phase setting for ProSe transmissions.

Adjusted wireless transmissions may then be performed using the new device-to-device transmission phase setting. The adjusted wireless transmissions may be device-to-device transmissions, such as ProSe transmissions. The new device-to-device transmission phase setting may be calculated in order to reduce interference between the first mobile terminal and a cellular mobile terminal. The interference between the first mobile terminal and the cellular mobile terminal may be caused by device-to-device transmissions performed by the first mobile terminal.

Method 400 may further include receiving a new transmit power level, wherein the new transmit power level is based on an interference level between the adjusted wireless transmissions and cellular communications of the cellular mobile terminal, and setting the transmit power for the first mobile terminal as the new transmit power level. The transmit power may be used for ProSe transmissions by the first mobile terminal. Method 400 may additionally include performing further adjusted wireless transmissions at the first mobile terminal based on the second transmission configuration parameter and the new transmit power level.

The base station may therefore calculate a new transmit power level as part of a ProSe TPC process and may send the new transmit power level to the first mobile terminal. The base station may calculated the new transmit power level based on interference measurements between the phase-adjusted wireless transmissions of the first mobile terminal and cellular communications of the cellular mobile terminal. The first mobile terminal may receive the new transmit power level, such as e.g. over a ProSe communication path from the base station to the first mobile terminal, and may set the transmit power as the new transmit power level.

Figure 6:
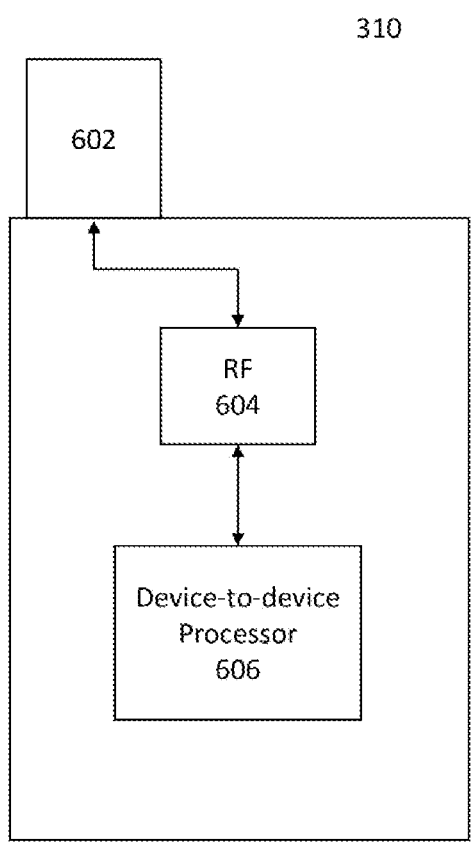
FIG. 6 shows various components and circuits of a mobile terminal device.

FIG. 6 shows internal components and circuits of mobile terminal 310. Mobile terminal device 310 may include antenna 602, RF transceiver 604, and device-to-device processor 606.

As detailed regarding FIGS. 3A and 3B, mobile terminal device 310 may transmit and receive wireless communication signals such as ProSe signals and cellular signals. Mobile terminal device 310 may receive wireless communication signals with antenna 602. Antenna 602 may be implemented as either a single antenna or as an antenna array including multiple antennas. Antenna 602 may be coupled to RF transceiver 604, which may be configured to process and digitize received wireless signals. RF transceiver 604 may be further configured to provide received wireless signals to device-to-device processor 606. Device-to-device processor 606 may be implemented as a processing circuit. Mobile terminal 310 may include various other components, such as a memory, various other processors and/or circuits, user input/output devices, etc., although these are not explicitly shown in FIG. 6.

RF transceiver 604 may be configured to provide for the transmission of wireless signals by modulating digital signals onto analog wireless radio signals. RF transceiver 604 may then provide modulated signals to antenna 602 for transmission to other wireless communication devices, such as ProSe-enabled mobile terminals or nearby base stations.

Device-to-device processor 606 may provide RF transceiver 604 with signals intended for transmission using device-to-device protocols, such as signals intended for transmission over ProSe links RF transceiver 604 may subsequently modulate the device-to-device signals onto radio frequency carriers and provide the modulated device-to-device signals to antenna 602 for transmission to other device-to-device-enabled devices.

Similarly, antenna 602 may provide RF transceiver 604 with received device-to-device signals. RF transceiver 604 may then provide the received device-to-device signals to device-to-device processor 606.

Device-to-device processor 606 may be configured to identify one or more further mobile terminals engaged in device-to-device communications with mobile terminal 310, wherein the one or more further mobile terminals are connected to a wireless communication network. Device-to-device processor 606 may be further configured to select an intermediary mobile terminal from the one or more further mobile terminals.

RF transceiver 604 may be configured to transmit mobile communication data from the mobile terminal device to the intermediary mobile terminal, wherein the uplink communication data is intended for transmission to a base station that is connected to the wireless communication network. RF transceiver 604 may utilize antenna 602 in order to perform transmission of the mobile communication data. Transmission of the mobile communication data may be performed using a device-to-device communication protocol, such as e.g. ProSe signaling.

RF transceiver 604 may be further configured to receive one or more measured wireless signal characteristics from at least one of the one or more further mobile terminals. As previously detailed, antenna 602 may receive wireless radio signals and provide the received wireless radio signals to RF transceiver 604. RF transceiver 604 may be configured to receive the one or more measured wireless signal characteristics over a device-to-device communication link.

Each of the one or more measured wireless signal characteristics may include an RSRP measurement. The RSRP measurements may be measured by the one or more further mobile terminals, and may be determined by measuring characteristics of device-to-device signals at the one or more further mobile terminals. The RSRP measurements may thus be RSRP measurements of ProSe signals received at the one or more further mobile terminals that were transmitted by the first mobile terminal. Device-to-device processor 606 may be configured to select the intermediary mobile terminal by selecting an intermediary mobile terminal based on the RSRP measurements.

Device-to-device processor 606 may be further configured to select the intermediary mobile terminal by selecting the further mobile terminal associated with a maximum-valued RSRP measurement as the intermediary mobile terminal.

Device-to-device processor 606 may be further configured to select the intermediary mobile terminal by selecting the further mobile terminal associated with the highest RSRP measurement as the intermediary mobile terminal.

RF transceiver 604 may be further configured to set a transmit power for wireless transmissions. The transmit power of RF transceiver 604 may be based on a level of interference between device-to-device signaling of mobile terminal 310 and cellular communications of a cellular mobile terminal connected to the wireless communication network. The transmit power of RF transceiver 604 may be determined based on transmit power control performed by the wireless communication network. The transmit power of RF transceiver 604 may additionally be selected such that the level of interference between device-to-device signaling of mobile terminal 310 and cellular communications of the cellular mobile terminal is reduced. The transmit power may be a transmit power for device-to-device communications, such as e.g. ProSe signaling.

RF transceiver 604 may be further configured to set the transmit power to a reduced transmit power level that is insufficient to complete direct ProSe Uplink transmissions between mobile terminal 310 and the base station. RF transceiver 604 may be further configured to set the transmit power to the reduced transmit power level before the device-to-device processor identifies the one or more further mobile terminals.

The mobile communication data transmitted by RF transceiver 604 may include a device-to-device discovery request. RF transceiver 604 may be further configured to receive a device-to-device discovery grant.

Device-to-device processor 606 may be configured to perform device-to-device discovery. Device-to-device processor 606 may be configured to identify a target mobile terminal during device-to-device discovery. Device-to-device processor 606 may be further configured to control RF transceiver 606 to transmit a device-to-device communication request over the intermediary communication link. The device-to-device communication request may include a request to perform device-to-device communications with the target mobile terminal.

RF transceiver 604 may be further configured to receive a device-to-device communication grant. Device-to-device processor 606 may be configured to perform device-to-device communications between mobile terminal 310 and the target mobile terminal. The device-to-device communication grant may include a grant to perform device-to-device communications with the target mobile terminal.

The mobile communication data transmitted by RF transceiver 604 may include a first transmission configuration parameter. RF transceiver 604 may be further configured to receive a second transmission configuration parameter. The second transmission configuration parameter may be determined by the wireless communication network based on the first transmission configuration parameter.

RF transceiver 604 may be further configured to perform adjusted wireless transmissions based on the second transmission configuration parameter. The adjusted wireless transmissions may be device-to-device transmissions such as ProSe Uplink and/or ProSe Downlink transmissions from the first mobile terminal. The first transmission configuration parameter may include an initial transmission phase setting for mobile terminal 310. The second transmission configuration parameter may include a new device-to-device transmission phase setting for mobile terminal 310. The phase settings may be a phase setting for device-to-device transmissions, such as e.g. ProSe transmissions.

RF transceiver 604 may be further configured to perform the adjusted wireless transmissions using the new device-to-device transmission phase setting. The adjusted wireless transmissions may be direct device-to-device communications, such as e.g. ProSe signaling. The new device-to-device transmission phase setting may be calculated in order to reduce interference between mobile terminal 310 and a cellular mobile terminal. The interference between mobile terminal 310 and the cellular mobile terminal may be caused by device-to-device transmissions performed by mobile terminal 310.

RF transceiver 604 may be further configured to receive a new transmit power level. The new transmit power may be based on an interference level between the adjusted wireless transmissions and cellular communications of the cellular mobile terminal, where the adjusted wireless transmissions may be ProSe transmissions. RF transceiver 604 may be further configured to perform further adjusted wireless transmissions based on the second transmission configuration parameter and the new transmit power level.

Figure 7:
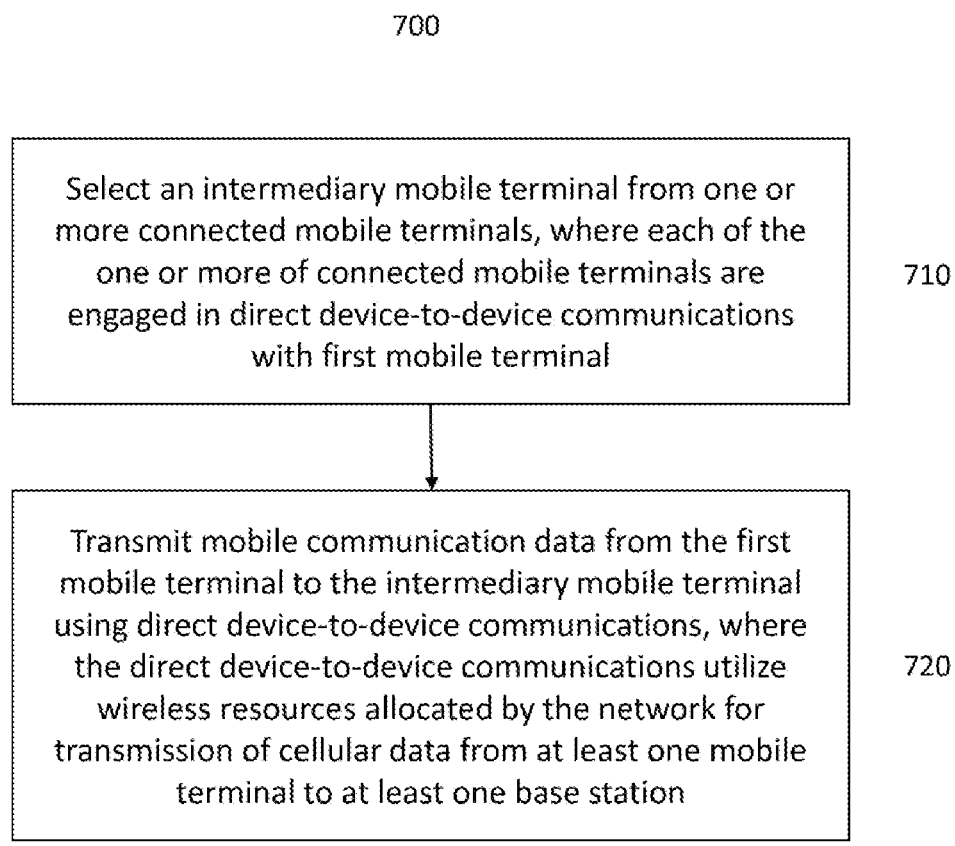
FIG. 7 shows a first method for performing mobile communications according to another aspect of the disclosure.

FIG. 7 shows a method 700 for performing mobile communication from a first mobile terminal according to another exemplary aspect of the disclosure.

Method 700 may include selecting an intermediary mobile terminal from one or more connected mobile terminals (710). Each of the one or more connected mobile terminals may be engaged in direct device-to-device communications with the first mobile terminal.

Method 700 may further include transmitting mobile communication data over direct device-to-device communications from the first mobile terminal to the intermediary mobile terminal (720), where the direct device-to-device communications utilize wireless resources allocated by the network for transmission of cellular data from at least one mobile terminal to at least one base station. In other words, the direct device-to-device communications may share wireless resources with conventional cellular uplink transmissions, such as transmissions of cellular data (e.g. voice, data, etc.) from a mobile terminal to a base station. The wireless resources may be carrier frequencies and/or timing frames such as subframes or slots. The allocation of wireless resources may be handled by the network. The device-to-device communication data may include information intended for a base station.

Figure 8:
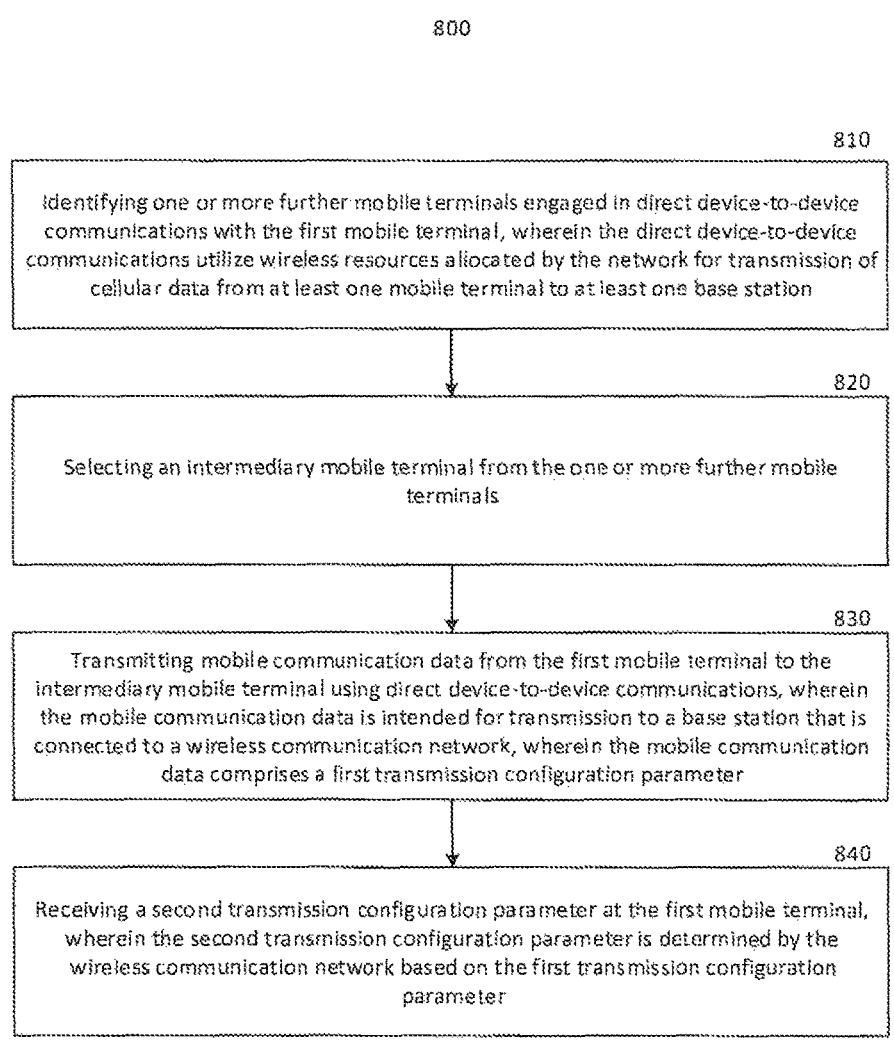
FIG. 8 shows a second method for performing mobile communications according to another aspect of the disclosure.

FIG. 8 shows method 800 for performing mobile communications from a first mobile terminal. As shown in FIG. 8, method 800 includes identifying one or more further mobile terminals engaged in direct device-to-device communications with the first mobile terminal (810), wherein the direct device-to-device communications utilize wireless resources allocated by the network for transmission of cellular data from at least one mobile terminal to at least one base station, selecting an intermediary mobile terminal from the one or more further mobile terminals (820), transmitting mobile communication data from the first mobile terminal to the intermediary mobile terminal using direct device-to-device communications (830), wherein the mobile communication data is intended for transmission to a base station that is connected to a wireless communication network, wherein the mobile communication data includes a first transmission configuration parameter, and receiving a second transmission configuration parameter at the first mobile terminal (840), and wherein the second transmission configuration parameter is determined by the wireless communication network based on the first transmission configuration parameter.

Figure 9:
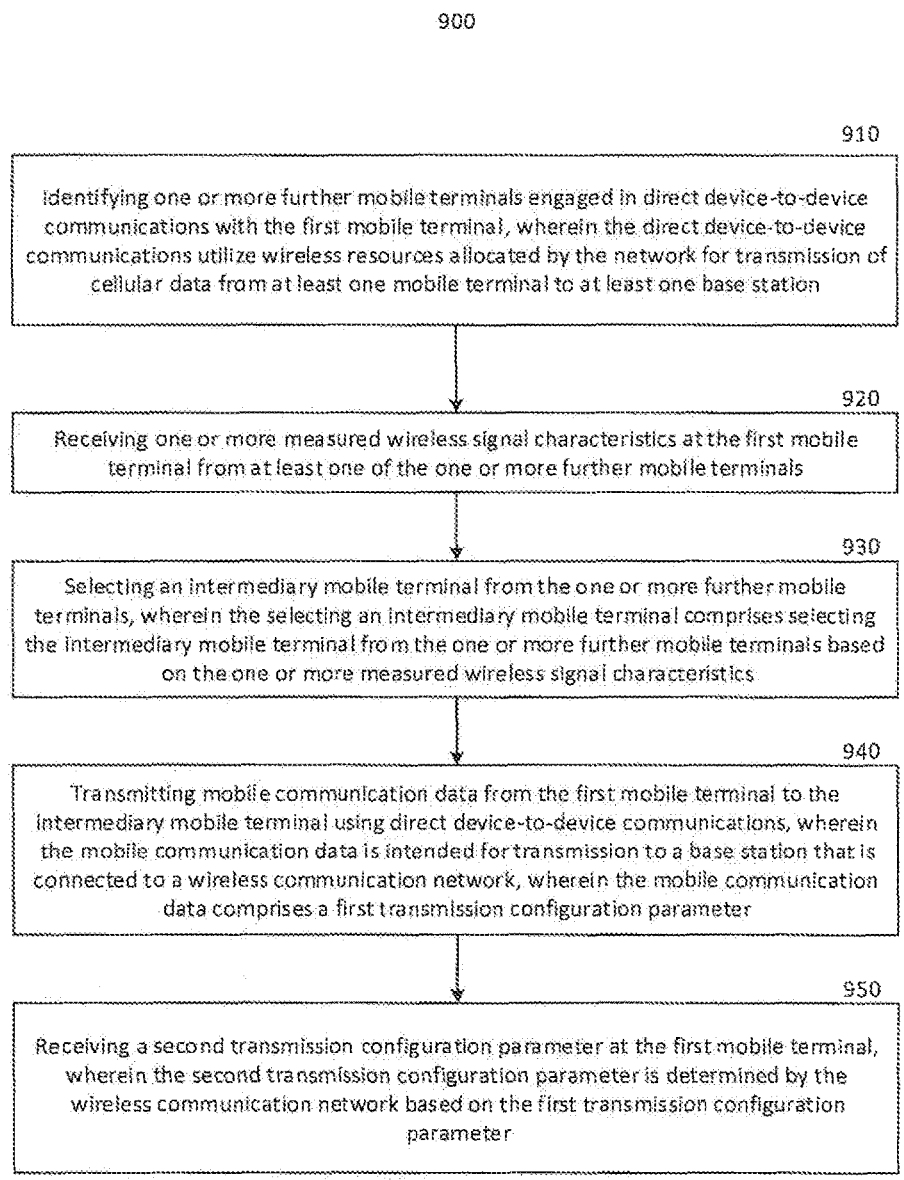
FIG. 9 shows a third method for performing mobile communications according to another aspect of the disclosure.

FIG. 9 shows method 900 for performing mobile communications from a first mobile terminal. As shown in FIG. 9, method 900 includes identifying one or more further mobile terminals engaged in direct device-to-device communications with the first mobile terminal (910), wherein the direct device-to-device communications utilize wireless resources allocated by the network for transmission of cellular data from at least one mobile terminal to at least one base station, receiving one or more measured wireless signal characteristics at the first mobile terminal from at least one of the one or more further mobile terminals (920), selecting an intermediary mobile terminal from the one or more further mobile terminals (930), wherein the selecting an intermediary mobile terminal includes selecting the intermediary mobile terminal from the one or more further mobile terminals based on the one or more measured wireless signal characteristics, transmitting mobile communication data from the first mobile terminal to the intermediary mobile terminal using direct device-to-device communications (940), wherein the mobile communication data is intended for transmission to a base station that is connected to a wireless communication network, wherein the mobile communication data includes a first transmission configuration parameter, and receiving a second transmission configuration parameter at the first mobile terminal (950), wherein the second transmission configuration parameter is determined by the wireless communication network based on the first transmission configuration parameter.

Figure 10:
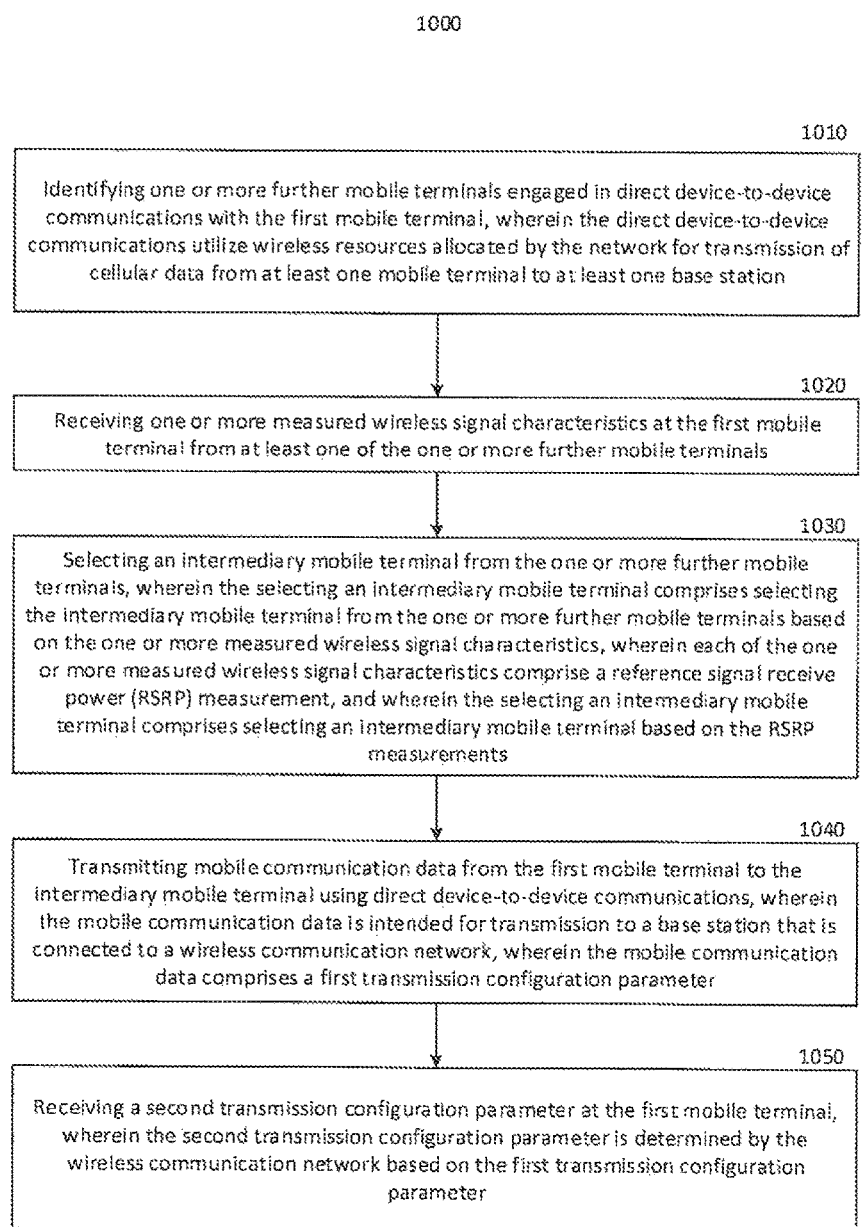
FIG. 10 shows a fourth method for performing mobile communications according to another aspect of the disclosure.

FIG. 10 shows method 1000 for performing mobile communications from a first mobile terminal. As shown in FIG. 10, method 1000 includes identifying one or more further mobile terminals engaged in direct device-to-device communications with the first mobile terminal (1010), wherein the direct device-to-device communications utilize wireless resources allocated by the network for transmission of cellular data from at least one mobile terminal to at least one base station, receiving one or more measured wireless signal characteristics at the first mobile terminal from at least one of the one or more further mobile terminals (1020), selecting an intermediary mobile terminal from the one or more further mobile terminals (1030), wherein the selecting an intermediary mobile terminal includes selecting the intermediary mobile terminal from the one or more further mobile terminals based on the one or more measured wireless signal characteristics, wherein each of the one or more measured wireless signal characteristics include a reference signal receive power (RSRP) measurement, and wherein the selecting an intermediary mobile terminal includes selecting an intermediary mobile terminal based on the RSRP measurements, transmitting mobile communication data from the first mobile terminal to the intermediary mobile terminal using direct device-to-device communications (1040), wherein the mobile communication data is intended for transmission to a base station that is connected to a wireless communication network, wherein the mobile communication data includes a first transmission configuration parameter, and receiving a second transmission configuration parameter at the first mobile terminal (1050), wherein the second transmission configuration parameter is determined by the wireless communication network based on the first transmission configuration parameter.

Figure 11:
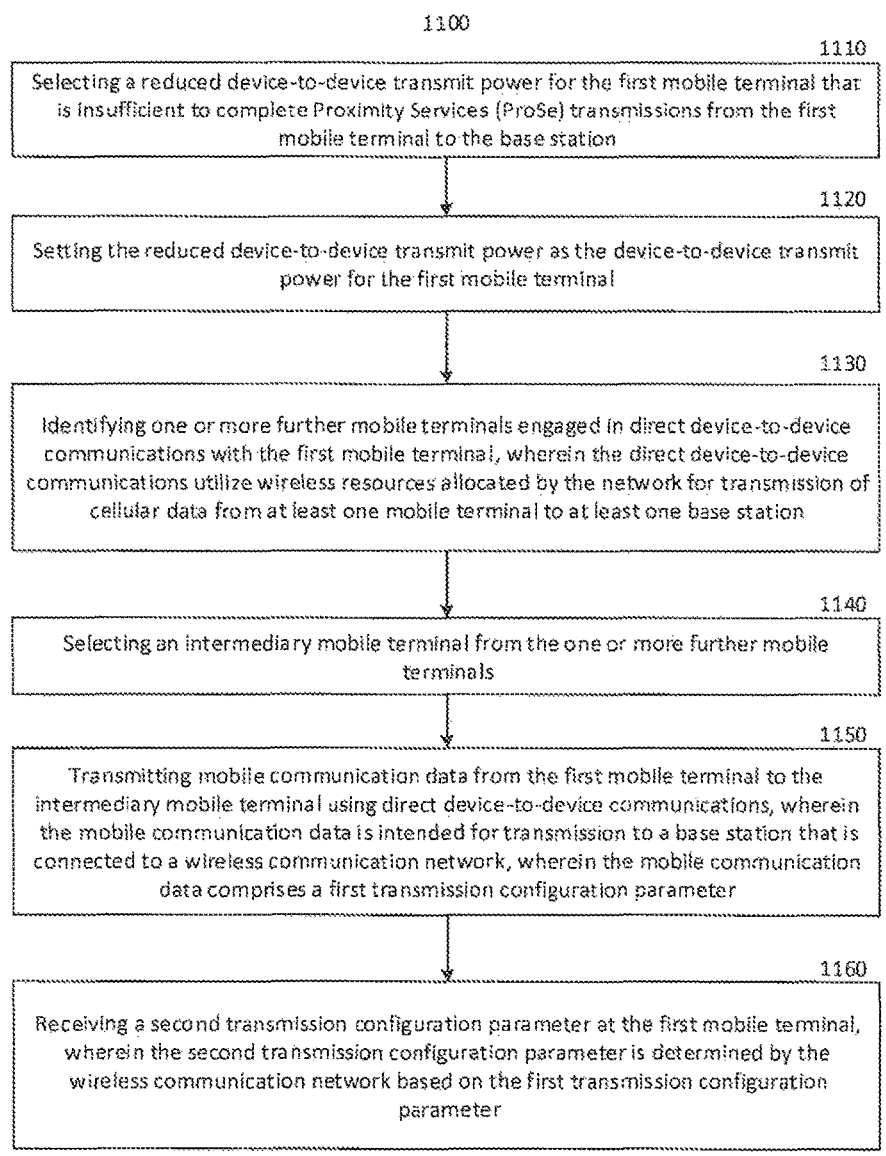
FIG. 11 shows a fifth method for performing mobile communications according to another aspect of the disclosure.

FIG. 11 shows method 1100 for performing mobile communications from a first mobile terminal. As shown in FIG. 11, method 1100 includes selecting a reduced device-to-device transmit power for the first mobile terminal that is insufficient to complete Proximity Services (ProSe) transmissions from the first mobile terminal to the base station (1110), setting the reduced device-to-device transmit power as the device-to-device transmit power for the first mobile terminal (1120), identifying one or more further mobile terminals engaged in direct device-to-device communications with the first mobile terminal (1130), wherein the direct device-to-device communications utilize wireless resources allocated by the network for transmission of cellular data from at least one mobile terminal to at least one base station, selecting an intermediary mobile terminal from the one or more further mobile terminals (1140), transmitting mobile communication data from the first mobile terminal to the intermediary mobile terminal using direct device-to-device communications (1150), wherein the mobile communication data is intended for transmission to a base station that is connected to a wireless communication network, wherein the mobile communication data includes a first transmission configuration parameter, and receiving a second transmission configuration parameter at the first mobile terminal (1160), wherein the second transmission configuration parameter is determined by the wireless communication network based on the first transmission configuration parameter.

Figure 12:
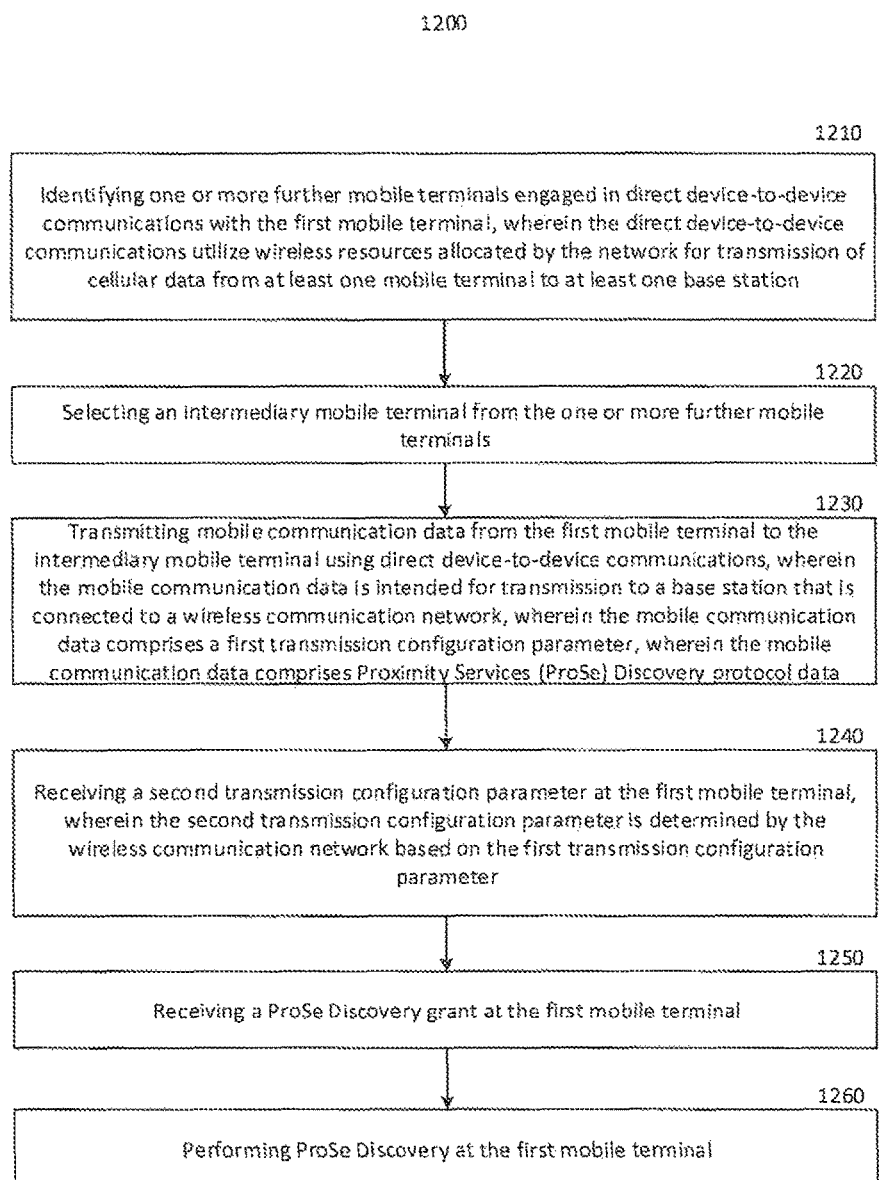
FIG. 12 shows a sixth method for performing mobile communications according to another aspect of the disclosure.

FIG. 12 shows method 1200 for performing mobile communications from a first mobile terminal. As shown in FIG. 12, method 1200 includes identifying one or more further mobile terminals engaged in direct device-to-device communications with the first mobile terminal (1210), wherein the direct device-to-device communications utilize wireless resources allocated by the network for transmission of cellular data from at least one mobile terminal to at least one base station, selecting an intermediary mobile terminal from the one or more further mobile terminals (1220), transmitting mobile communication data from the first mobile terminal to the intermediary mobile terminal using direct device-to-device communications (1230), wherein the mobile communication data is intended for transmission to a base station that is connected to a wireless communication network, wherein the mobile communication data includes a first transmission configuration parameter, wherein the mobile communication data includes Proximity Services (ProSe) Discovery protocol data, receiving a second transmission configuration parameter at the first mobile terminal (1240), wherein the second transmission configuration parameter is determined by the wireless communication network based on the first transmission configuration parameter, receiving a ProSe Discovery grant at the first mobile terminal (1250), and performing ProSe Discovery at the first mobile terminal (1260).

Figure 13:
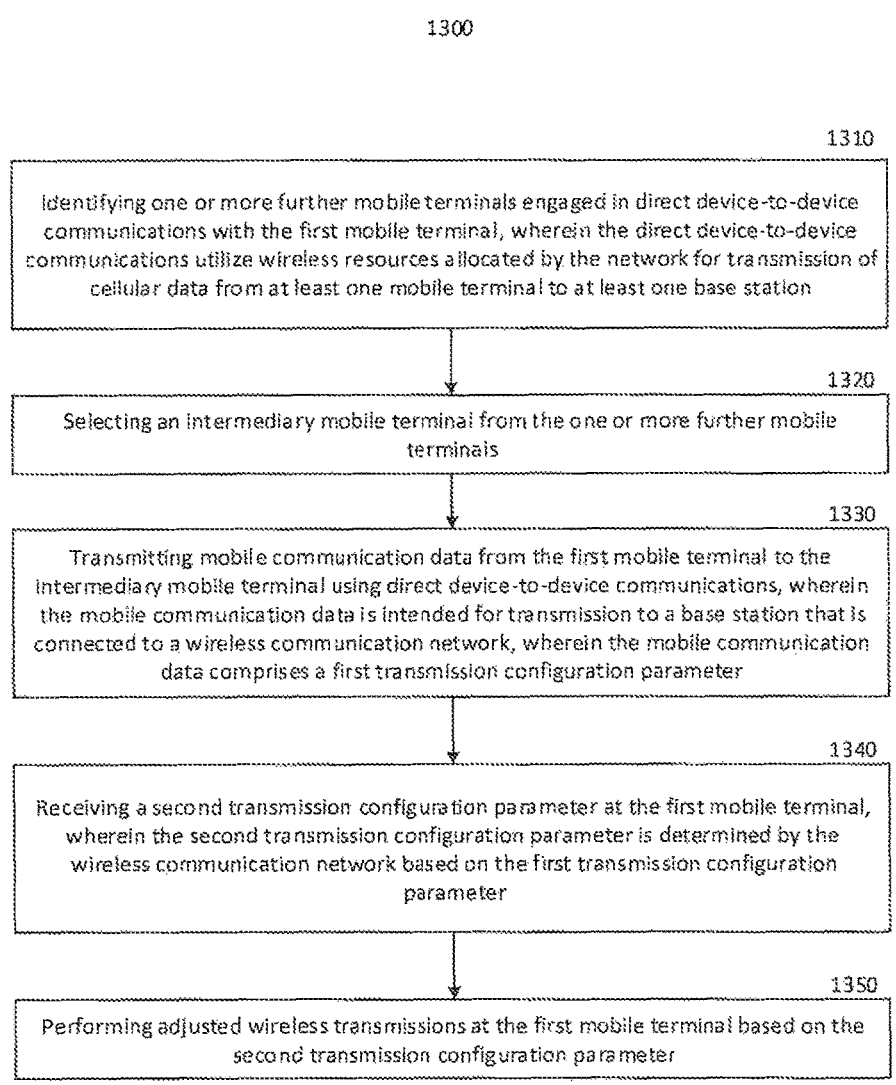
FIG. 13 shows a seventh method for performing mobile communications according to another aspect of the disclosure.

FIG. 13 shows method 1300 of performing mobile communications from a first mobile terminal. As shown in FIG. 13, method 1300 includes identifying one or more further mobile terminals engaged in direct device-to-device communications with the first mobile terminal (1310), wherein the direct device-to-device communications utilize wireless resources allocated by the network for transmission of cellular data from at least one mobile terminal to at least one base station, selecting an intermediary mobile terminal from the one or more further mobile terminals (1320), transmitting mobile communication data from the first mobile terminal to the intermediary mobile terminal using direct device-to-device communications (1330), wherein the mobile communication data is intended for transmission to a base station that is connected to a wireless communication network, wherein the mobile communication data includes a first transmission configuration parameter, receiving a second transmission configuration parameter at the first mobile terminal (1340), wherein the second transmission configuration parameter is determined by the wireless communication network based on the first transmission configuration parameter, and performing adjusted wireless transmissions at the first mobile terminal based on the second transmission configuration parameter (1350).

Numerous additional variations of the systems and methods as disclosed are possible. For example, while an intermediary communication path has been disclosed as transmitting ProSe signaling and supporting phase alignment, an intermediary communication path may be utilized to transmit any number of signals from a mobile terminal to a base station. For example, an established intermediary communication path used for transmission of ProSe related data may be to transmit channel state information (CSI). This channel state information may be determined at a low power mobile terminal based on ProSe signals received by the low power mobile terminal from a base station. The low power mobile terminal may then wish to send the base station CSI that details the wireless channel. However, this ProSe-related CSI may need to be transmitted using strictly ProSe-dedicated resources (as only specific wireless resources are allocated for ProSe communications by 3GPP). Accordingly, a loss in ProSe Uplink channel with a base station due to ProSe-related interference may prevent the transmission of ProSe CSI from the low power mobile terminal to the base station. The low power mobile terminal may therefore establish an intermediary communication link with a ProSe-connected mobile terminal in order to successfully transmit the CSI to the base station. As previously detailed, further information such as e.g. a ProSe transmission phase setting may be included along with CSI.

Additionally, an intermediary communication path may include more than one intermediary mobile terminal. For example, a low power mobile terminal may send ProSe Uplink communications through more than one intermediary mobile terminal in order to complete ProSe Uplink transmissions to a base station. Any number of levels in such extended ProSe Uplink intermediary communication paths are possible. For example, a mobile terminal may send a ProSe Uplink transmission to a first intermediary mobile terminal using device-to-device communications. The first intermediary mobile terminal may then send the ProSe Uplink transmissions to a second intermediary mobile terminal using device-to-device communications. The second intermediary mobile terminal may then complete the ProSe Uplink intermediary communication path by sending the ProSe Uplink transmission to a base station. The ProSe Uplink intermediary communication path in this case may include two device-to-device communication links and a further cellular communication link. Many such variations in the length of the ProSe Uplink intermediary communication path are possible.

Additionally, a low power mobile terminal may utilize more than on ProSe Uplink intermediary communication path. For example, a low power mobile terminal may select two intermediary mobile terminals, and may send both intermediary mobile terminals ProSe Uplink transmissions directly over device-to-device communication links. Both intermediary mobile terminals may then send the ProSe Uplink transmissions to a connected to a base station. A low power mobile terminal may accordingly use any number of ProSe Uplink intermediary communication paths in order to complete uplink transmissions.

These variations may additionally utilize measured wireless signal characteristics in order to select an appropriate uplink intermediary communication path. For example, the first intermediary mobile terminal may utilize RSRP measurements in order to select the second intermediary mobile terminal. Similarly, a low power mobile terminal may select more than one intermediary mobile terminal based on RSRP measurements.

Additionally, a low power mobile terminal may decide not to establish a ProSe Uplink intermediary mobile communication path. For example, a low power mobile terminal may decide that the existing device-to-device communication links are of poor quality based on received RSRP measurements. The low power mobile terminal may therefore decide not to initiate an intermediary communication path in order to complete ProSe Uplink transmissions to a base station.

There also exist several variations for how the communication data is transmitted over the intermediary communication path. For example, the communication data transmitted to a base station from an intermediary mobile terminal may be identical to the communication data transmitted to the intermediary mobile terminal by a low power mobile terminal. In other words, the intermediary mobile terminal may simply forward the communication data to a base station. In another exemplary aspect, the intermediary mobile terminal may first perform processing on communication data received from a low power mobile terminal. The intermediary mobile terminal may then transmit the processed communication data to a base station.

The following examples pertain to further aspects of this disclosure:

Example 1 is a method for performing mobile communications from a first mobile terminal. The method includes identifying one or more further mobile terminals engaged in direct device-to-device communications with the first mobile terminal, selecting an intermediary mobile terminal from the one or more further mobile terminals, and transmitting mobile communication data from the first mobile terminal to the intermediary mobile terminal using direct device-to-device communications. The mobile communication data is intended for transmission to a base station that is connected to a wireless communication network.

In Example 2, the subject matter of Example 1 can optionally include wherein the direct device-to-device communications utilize wireless resources that are allocated by the wireless communication network for direct device-to-device communications.

In Example 3, the subject matter of Example 2 can optionally include receiving one or more measured wireless signal characteristics at the first mobile terminal from at least one of the one or more further mobile terminals. The selecting an intermediary mobile terminal can include selecting the intermediary mobile terminal from the one or more further mobile terminals based on the one or more measured wireless signal characteristics.

In Example 4, the subject matter of Example 3 can optionally include wherein the one or more measured wireless signal characteristics are received over a direct device-to-device communication link.

In Example 5, the subject matter of Example 3 or 4 can optionally include wherein each of the one or more measured wireless signal characteristics includes a reference signal receive power (RSRP) measurement, and wherein the selecting an intermediary mobile terminal includes selecting an intermediary mobile terminal based on the RSRP measurements.

In Example 6, the subject matter of Example 5 can optionally include wherein the selecting an intermediary mobile terminal includes selecting the further mobile terminal associated with a maximum-valued RSRP measurement as the intermediary mobile terminal.

In Example 7, the subject matter of Example 5 or 6 can optionally include wherein the selecting an intermediary mobile terminal includes selecting the further mobile terminal associated with the highest RSRP measurement as the intermediary mobile terminal.

In Example 8, the subject matter of Examples 2 to 7 can optionally include setting a device-to-device transmit power for the first mobile terminal.

In Example 9, the subject matter of Example 8 can optionally include wherein the device-to-device transmit power is based on a level of interference between device-to-device communications of the first mobile terminal and cellular communications of a cellular mobile terminal connected to the wireless communication network.

In Example 10, the subject matter of Example 8 or 9 can optionally include wherein the device-to-device transmit power is determined based on transmit power control performed by the wireless communication network.

In Example 11, the subject matter of Example 9 or 10 can optionally include wherein the device-to-device transmit power is selected such that the level of interference between device-to-device communications of the first mobile terminal and cellular communications of the cellular mobile terminal is reduced.

In Example 12, the subject matter of Examples 8 to 11 can optionally include wherein the device-to-device transmit power is set to a reduced device-to-device transmit power level that is insufficient to complete ProSe transmissions from the first mobile terminal to the base station.

In Example 13, the subject matter of Example 12 can optionally include wherein the device-to-device transmit power is set to the reduced device-to-device transmit power level before the one or further mobile terminals are identified.

In Example 14, the subject matter of Examples 2 to 13 can optionally include wherein the mobile communication data includes Proximity Services (ProSe) Discovery protocol data.

In Example 15, the subject matter of Example 14 can optionally include receiving a ProSe Discovery grant at the first mobile terminal and performing ProSe Discovery at the first mobile terminal.

In Example 16, the subject matter of Example 15 can optionally include wherein the performing ProSe Discovery includes identifying a target mobile terminal, and transmitting a ProSe communication request from the first mobile terminal to the intermediary mobile terminal using direct device-to-device communications.

In Example 17, the subject matter of Example 16 can optionally include wherein the ProSe Communication request includes a request to perform ProSe Communications with the target mobile terminal.

In Example 18, the subject matter of Example 16 or 17 can optionally include receiving a ProSe Communication grant at the first mobile terminal, and performing ProSe Communications between the first mobile terminal and the target mobile terminal.

In Example 19, the subject matter of Example 18 can optionally include wherein the ProSe Communication grant includes a grant to perform ProSe Communications with the target mobile terminal.

In Example 20, the subject matter of Examples 2 to 19 can optionally include wherein the mobile communication data includes a first transmission configuration parameter.

In Example 21, the subject matter of Example 20 can optionally include receiving a second transmission configuration parameter at the first mobile terminal, and wherein the second transmission configuration parameter is determined by the wireless communication network based on the first transmission configuration parameter.

In Example 22, the subject matter of Example 21 can optionally include performing adjusted wireless transmissions at the first mobile terminal based on the second transmission configuration parameter.

In Example 23, the subject matter of Example 21 or 22 can optionally include wherein the first transmission configuration parameter includes an initial transmission phase setting of the first mobile terminal, and wherein the second transmission configuration parameter includes a new device-to-device transmission phase setting of the first mobile terminal.

In Example 24, the subject matter of Example 23 can optionally include wherein the adjusted wireless transmissions are performed using the new device-to-device transmission phase setting.

In Example 25, the subject matter of Examples 22 or 24 can optionally include wherein the new device-to-device transmission phase setting is calculated in order to reduce interference between the first mobile terminal and a cellular mobile terminal.

In Example 26, the subject matter of Example 25 can optionally include wherein the interference between the first mobile terminal and the cellular mobile terminal are caused by device-to-device communications performed by the first mobile terminal.

In Example 27, the subject matter of Example 25 or 26 can optionally include receiving a new device-to-device transmit power level, where the new device-to-device transmit power level is based on an interference level between the adjusted wireless transmissions and cellular communications of the cellular mobile terminal, and setting the device-to-device transmit power for the first mobile terminal as the new device-to-device transmit power level.

In Example 28, the subject matter of Example 27 can optionally include performing further adjusted wireless transmissions at the first mobile terminal based on the second transmission configuration parameter and the new device-to-device transmit power level.

Example 29 is a mobile terminal device. The mobile terminal device includes a device-to-device processing circuit configured to identify one or more further mobile terminals engaged in direct device-to-device communications with the mobile terminal device and configured to select an intermediary mobile terminal from the one or more further mobile terminals, and a transceiver configured to transmit mobile communication data from the mobile terminal device to the intermediary mobile terminal using direct device-to-device communications. The mobile communication data is intended for transmission to a base station that is connected to a wireless communication network.

In Example 30, the subject matter of Example 28 can optionally include wherein the direct device-to-device communications utilize wireless resources that are allocated by the wireless communication network for direct device-to-device communications.

In Example 31, the subject matter of Example 30 can optionally include wherein the transceiver is further configured to receive one or more measured wireless signal characteristics at the first mobile terminal from at least one of the one or more further mobile terminals, and wherein the device-to-device processing circuit is further configured to select the intermediary mobile terminal by selecting the intermediary mobile terminal from the one or more further mobile terminals based on the one or more measured wireless signal characteristics.

In Example 32, the subject matter of Example 31 can optionally include wherein the transceiver is configured to receive the one or more measured wireless signal characteristics over direct device-to-device communications.

In Example 33, the subject matter of Example 31 or 32 can optionally include wherein each of the one or more measured wireless signal characteristics include a reference signal receive power (RSRP) measurement, and wherein the device-to-device processing circuit is configured to select the intermediary mobile terminal based on the RSRP measurements. In Example 34, the subject matter of Example 33 can optionally include wherein the device-to-device processing circuit is further configured to select the intermediary mobile terminal by selecting the further mobile terminal associated with a maximum-valued RSRP measurement as the intermediary mobile terminal.

In Example 35, the subject matter of Example 32 or 34 can optionally include wherein the device-to-device processing circuit is further configured to select the intermediary mobile terminal by selecting the further mobile terminal associated with the highest RSRP measurement as the intermediary mobile terminal.

In Example 36, the subject matter of Examples 30 to 35 can optionally include wherein the transceiver is further configured to set a device-to-device transmit power for wireless transmissions.

In Example 37, the subject matter of Example 36 can optionally include wherein the device-to-device transmit power of the transceiver is based on a level of interference between device-to-device communications of the first mobile terminal and cellular communications of a cellular mobile terminal connected to the wireless communication network.

In Example 38, the subject matter of Example 36 or 37 can optionally include wherein the device-to-device transmit power of the transceiver is determined based on device-to-device transmit power control performed by the wireless communication network.

In Example 39, the subject matter of Example 36 to 38 can optionally include wherein the device-to-device transmit power of the transceiver is selected such that the level of interference between device-to-device communications of the first mobile terminal and uplink cellular communications of the cellular mobile terminal is reduced.

In Example 40, the subject matter of Examples 36 to 39 can optionally include wherein the transceiver is further configured to set the device-to-device transmit power to a reduced device-to-device transmit power level that is insufficient to complete ProSe transmissions from the first mobile terminal to the base station.

In Example 41, the subject matter of Examples 36 to 40 can optionally include wherein the transceiver is further configured to set the device-to-device transmit power to the reduced device-to-device transmit power level before the device-to-device processing circuit identifies the one or more further mobile terminals.

In Example 42, the subject matter of Examples 30 to 41 can optionally include wherein the mobile communication data transmitted by the transceiver includes a Proximity Services (ProSe) Discovery request.

In Example 43, the subject matter of Example 42 can optionally include wherein the transceiver is further configured to receive a ProSe Discovery grant at the first mobile terminal.

In Example 44, the subject matter of Examples 30 to 43 can optionally include wherein the device-to-device processing circuit is further configured to perform ProSe Discovery.

In Example 45, the subject matter of Examples 42 to 44 can optionally include wherein the device-to-device processing circuit is further configured to identify a target mobile terminal and wherein the device-to-device processing circuit is further configured to control the transceiver to transmit a ProSe Communication request from the mobile terminal device to the intermediary mobile terminal using direct device-to-device communications.

In Example 46, the subject matter of Example 45 can optionally include wherein the ProSe Communication request includes a request to perform ProSe Communications with the target mobile terminal.

In Example 47, the subject matter of Example 45 can optionally include wherein the transceiver is further configured to receive a ProSe Communication grant and wherein the device-to-device processing circuit is further configured to perform ProSe Communication between the mobile terminal device and the target mobile terminal.

In Example 48, the subject matter of Example 47 can optionally include wherein the ProSe Communication grant includes a grant to perform ProSe Communications with the target mobile terminal.

In Example 49, the subject matter of Examples 30 to 48 can optionally include wherein the mobile communication data transmitted by the transceiver includes a first transmission configuration parameter.

In Example 50, the subject matter of Example 49 can optionally include wherein the transceiver is further configured to receive a second transmission configuration parameter, and wherein the second transmission configuration parameter is determined by the wireless communication network based on the first transmission configuration parameter.

In Example 51, the subject matter of Example 50 can optionally include wherein the transceiver is further configured to perform adjusted device-to-device transmissions based on the second transmission configuration parameter.

In Example 52, the subject matter of Examples 50 or 51 can optionally include wherein the first transmission configuration parameter includes an initial device-to-device transmission phase setting of the first mobile terminal, and wherein the second transmission configuration parameter includes a new device-to-device transmission phase setting of the first mobile terminal.

In Example 53, the subject matter of Example 52 can optionally include wherein the transceiver is further configured to perform the adjusted device-to-device transmissions using the new device-to-device transmission phase setting.

In Example 54, the subject matter of Example 52 or 53 can optionally include wherein the new device-to-device transmission phase setting is calculated in order to reduce interference between the first mobile terminal and a cellular mobile terminal.

In Example 55, the subject matter of Example 54 can optionally include wherein the interference between the first mobile terminal and the cellular mobile terminal are caused by device-to-device transmissions performed by the first mobile terminal.

In Example 56, the subject matter of Example 54 or 55 can optionally include wherein the transceiver is further configured to receive a new device-to-device transmit power level, where the new device-to-device transmit power level is based on an interference level between the adjusted device-to-device transmissions and cellular communications of the cellular mobile terminal, and wherein the transceiver is further configured to set the new device-to-device transmit power level as the device-to-device transmit power.

In Example 57, the subject matter of Example 56 can optionally include wherein the transceiver is further configured to perform further adjusted device-to-device transmissions at the first mobile terminal based on the second transmission configuration parameter and the new transmit device-to-device power level.

Example 58 is a method of transmitting mobile communication data from a first mobile terminal. The method includes selecting an intermediary mobile terminal from one or more connected mobile terminals, where each of the one or more connected mobile terminals are engaged in direct device-to-device communications with the first mobile terminal, and transmitting device-to-device communication data over direct device-to-device communications from the first mobile terminal to the intermediary mobile terminal. The device-to-device communication data includes information intended for a base station.

In Example 59, the subject matter of Example 58 can optionally include where the direct device-to-device communications utilize wireless resources allocated by the network for transmission of cellular data from at least one mobile terminal to at least one base station In Example 60, the subject matter of Example 59 can optionally include receiving one or more measured wireless signal characteristics at the first mobile terminal from at least one of the one or more connected mobile terminals. The selecting an intermediary mobile terminal can include selecting the intermediary mobile terminal from the one or more connected mobile terminals based on the one or more measured wireless signal characteristics.

In Example 61, the subject matter of Example 60 can optionally include wherein the one or more measured wireless signal characteristics are received over a direct device-to-device communication link between the first mobile terminal and the one or more connected mobile terminals.

In Example 62, the subject matter of Example 60 or 61 can optionally include wherein the one or more measured wireless signal characteristics include a reference signal receive power (RSRP) measurement, and wherein the selecting an intermediary mobile terminal includes selecting an intermediary mobile terminal based on the RSRP measurements.

In Example 63, the subject matter of Example 62 can optionally include wherein the selecting an intermediary mobile terminal includes selecting the connected mobile terminal associated with a maximum-valued RSRP measurement as the intermediary mobile terminal.

In Example 64, the subject matter of Example 62 or 63 can optionally include wherein the selecting an intermediary mobile terminal includes selecting the connected mobile terminal associated with the highest RSRP measurement as the intermediary mobile terminal.

In Example 65, the subject matter of Examples 59 to 64 can optionally include setting a device-to-device transmit power for the first mobile terminal.

In Example 66, the subject matter of Example 65 can optionally include wherein the device-to-device transmit power is based on a level of interference between device-to-device communications of the first mobile terminal and cellular uplink communications of a cellular mobile connected to the wireless communication network.

In Example 67, the subject matter of Example 65 or 66 can optionally include wherein the device-to-device transmit power is based on device-to-device transmit power control performed by the wireless communication network.

In Example 68, the subject matter of Examples 65 to 67 can optionally include wherein the device-to-device transmit power is selected such that the level of interference between device-to-device communications of the first mobile terminal and cellular uplink communications of the cellular mobile terminal is reduced.

In Example 69, the subject matter of Examples 65 to 68 can optionally include wherein the device-to-device transmit power is set to a reduced device-to-device transmit power level that is insufficient to complete Proximity Services (ProSe) transmissions from the first mobile terminal to the base station.

In Example 70, the subject matter of Examples 65 to 69 can optionally include wherein the device-to-device transmit power is set to the reduced device-to-device transmit power level before the one or connected mobile terminals are identified.

In Example 71, the subject matter of Examples 59 to 70 can optionally include wherein the mobile communication data includes Proximity Services (ProSe) Discovery protocol data.

In Example 72, the subject matter of Example 71 can optionally include receiving a ProSe Discovery grant at the first mobile terminal and performing ProSe Discovery at the first mobile terminal.

In Example 73, the subject matter of Example 72 can optionally include wherein the performing ProSe Discovery includes identifying a target mobile terminal, and further including transmitting a ProSe Communication request from the first mobile terminal to the intermediary mobile terminal using direct device-to-device communications.

In Example 74, the subject matter of Example 73 can optionally include wherein the ProSe Communication request includes a request to perform ProSe Communications with the target mobile terminal.

In Example 75, the subject matter of Example 73 receiving a ProSe Communication grant at the first mobile terminal, and performing ProSe Communications between the first mobile terminal and the target mobile terminal.

In Example 76, the subject matter of Example 75 can optionally include wherein the ProSe Communication grant includes a grant to perform ProSe Communications with the target mobile terminal.

In Example 77, the subject matter of Examples 59 to 76 can optionally include wherein the mobile communication data includes a first transmission configuration parameter.

In Example 78, the subject matter of Example 77 can optionally include receiving a second transmission configuration parameter at the first mobile terminal, wherein the second transmission configuration parameter is determined by the wireless communication network based on the first transmission configuration parameter.

In Example 79, the subject matter of Example 78 can optionally include performing adjusted wireless device-to-device transmissions at the first mobile terminal based on the second transmission configuration parameter.

In Example 80, the subject matter of Example 78 or 79 can optionally include wherein the first transmission configuration parameter includes an initial transmission phase setting for device-to-device transmissions by the first mobile terminal, and wherein the second transmission configuration parameter includes a new device-to-device transmission phase setting for device-to-device transmissions of the first mobile terminal.

In Example 81, the subject matter of Example 79 or 80 can optionally include wherein the adjusted device-to-device wireless transmissions are performed using the new device-to-device transmission phase setting.

In Example 82, the subject matter of Example 80 or 81 can optionally include wherein the new device-to-device transmission phase setting is calculated in order to reduce interference between the first mobile terminal and a cellular mobile terminal.

In Example 83, the subject matter of Example 82 can optionally include wherein the interference between the first mobile terminal and the cellular mobile terminal are caused by device-to-device transmissions performed by the first mobile terminal.

In Example 84, the subject matter of Example 82 or 83 can optionally include receiving a new device-to-device transmit power level, where the new transmit device-to-device transmit power level is based on an interference level between the adjusted wireless transmissions and cellular communications of the cellular mobile terminal, and setting a device-to-device transmit power for the first mobile terminal as the new device-to-device transmit power level.

In Example 85, the subject matter of Example 84 can optionally include performing further adjusted wireless transmissions at the first mobile terminal based on the second transmission configuration parameter and the new device-to-device transmit power level.

Example 86 is a mobile terminal device. The mobile terminal device includes a device-to-device processing circuit configured to select an intermediary mobile terminal from one or more connected mobile terminals, where each of the one or more connected mobile terminals are engaged in direct device-to-device communications with the first mobile terminal, and a transceiver configured to transmit device-to-device communication data over direct device-to-device communications from the mobile terminal device to the intermediary device using direct device-to-device communications. The device-to-device communication data includes information intended for a base station.

In Example 87, the subject matter of Example 86 can optionally include wherein the direct device-to-device communications utilize wireless resources allocated by the network for transmission of cellular data from at least one mobile terminal to at least one base station In Example 88, the subject matter of Example 87 can optionally include wherein the transceiver is further configured to receive one or more measured wireless signal characteristics from at least one of the one or more connected mobile terminals, and wherein the device-to-device processing circuit is further configured to select the intermediary mobile terminal by selecting the intermediary mobile terminal from the one or more connected mobile terminals based on the one or more measured wireless signal characteristics.

In Example 89, the subject matter of Example 88 can optionally include wherein the transceiver is configured to receive the one or more measured wireless signal characteristics over direct device-to-device communications.

In Example 90, the subject matter of Example 87 or 88 can optionally include wherein each of the one or more measured wireless signal characteristics include a reference signal receive power (RSRP) measurement, and wherein the device-to-device processing circuit is configured to select the intermediary mobile terminal by selecting an intermediary mobile terminal based on the RSRP measurements.

In Example 91, the subject matter of Example 90 can optionally include wherein the device-to-device processing circuit is further configured to select the intermediary mobile terminal by selecting the further mobile terminal associated with a maximum-valued RSRP measurement as the intermediary mobile terminal.

In Example 92, the subject matter of Example 90 or 91, wherein the device-to-device processing circuit is further configured to select the intermediary mobile terminal by selecting the further mobile terminal associated with the highest RSRP measurement as the intermediary mobile terminal.

In Example 93, the subject matter of Examples 87 to 92 can optionally include wherein the transceiver is further configured to set a device-to-device transmit power for wireless transmissions.

In Example 94, the subject matter of Example 93 wherein the device-to-device transmit power of the transceiver is based on a level of interference between device-to-device communications of the first mobile terminal and uplink cellular communications of a cellular mobile terminal connected to the wireless communication network.

In Example 95, the subject matter of Example 93 or 94 can optionally include wherein the device-to-device transmit power of the transceiver is determined based on device-to-device transmit power control performed by the wireless communication network.

In Example 96, the subject matter of Examples 93 to 95 can optionally include wherein the device-to-device transmit power of the transceiver is selected such that the level of interference between device-to-device communications of the first mobile terminal and uplink cellular communications of the cellular mobile terminal is reduced.

In Example 97, the subject matter of Examples 93 to 96 can optionally include wherein the transceiver is further configured to set the device-to-device transmit power to a reduced device-to-device transmit power level that is insufficient to complete ProSe transmissions from the first mobile terminal to the base station.

In Example 98, the subject matter of Examples 93 to 97 can optionally include wherein the transceiver is further configured to set the device-to-device transmit power to the reduced device-to-device transmit power level before the device-to-device processing circuit identifies the one or more further mobile terminals.

In Example 99, the subject matter of Examples 87 to 98 can optionally include wherein the mobile communication data transmitted by the transceiver includes a Proximity Services (ProSe) Discovery request.

In Example 100, the subject matter of Example 99 can optionally include wherein the transceiver is further configured to receive a ProSe Discovery grant at the first mobile terminal.

In Example 101, the subject matter of Examples 87 to 100 can optionally include wherein the device-to-device processing circuit is further configured to perform ProSe Discovery.

In Example 102, the subject matter of Example 101 can optionally include wherein the device-to-device processing circuit is further configured to identify a target mobile terminal, an wherein the device-to-device processing circuit is further configured to control the transceiver to transmit a ProSe Communication request from the mobile terminal device to the intermediary mobile terminal using direct device-to-device communications.

In Example 103, the subject matter of Example 102 can optionally include wherein the ProSe Communication request includes a request to perform ProSe Communications with the target mobile terminal.

In Example 104, the subject matter of Example 102 can optionally include wherein the transceiver is further configured to receive a ProSe Communication grant, and wherein the device-to-device processing circuit is further configured to perform ProSe Communication between the mobile terminal device and the target mobile terminal.

In Example 105, the subject matter of Example 104 can optionally include wherein the ProSe Communication grant includes a grant to perform ProSe Communications with the target mobile terminal.

In Example 106, the subject matter of Example 87 to 105 can optionally include wherein the mobile communication data transmitted by the transceiver includes a first transmission configuration parameter.

In Example 107, the subject matter of Example 106 can optionally include wherein the transceiver is further configured to receive a second transmission configuration parameter, and wherein the second transmission configuration parameter is determined by the wireless communication network based on the first transmission configuration parameter.

In Example 108, the subject matter of Example 107 can optionally include wherein the transceiver is further configured to perform adjusted device-to-device transmissions based on the second transmission configuration parameter.

In Example 109, the subject matter of Example 107 or 108 can optionally include wherein the first transmission configuration parameter includes an initial device-to-device transmission phase setting of the first mobile terminal, and wherein the second transmission configuration parameter includes a new device-to-device transmission phase setting of the first mobile terminal.

In Example 110, the subject matter of Example 109 can optionally include wherein the transceiver is further configured to perform the adjusted device-to-device transmissions using the new device-to-device transmission phase setting.

In Example 111, the subject matter of Example 109 or 110 can optionally include wherein the new device-to-device transmission phase setting is calculated in order to reduce interference between the first mobile terminal and a cellular mobile terminal.

In Example 112, the subject matter of Example 111 can optionally include wherein the interference between the first mobile terminal and the cellular mobile terminal is caused by device-to-device transmissions performed by the first mobile terminal.

In Example 113, the subject matter of Example 111 or 112 can optionally include wherein the transceiver is further configured to receive a new device-to-device transmit power level, where the new device-to-device transmit power level is based on an interference level between the adjusted device-to-device transmissions and cellular communications of the cellular mobile terminal, and wherein the transceiver is further configured to set the new device-to-device transmit power level as the device-to-device transmit power.

In Example 114, the subject matter of Example 113 can optionally include wherein the transceiver is further configured to perform further adjusted device-to-device transmissions at the first mobile terminal based on the second transmission configuration parameter and the new transmit device-to-device power level.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for performing mobile communications from a first mobile terminal comprising:
    identifying one or more further mobile terminals engaged in direct device-to-device communications with the first mobile terminal, wherein the direct device-to-device communications utilize wireless resources allocated by a wireless communication network for transmission of cellular data from at least one mobile terminal to at least one base station;
    selecting an intermediary mobile terminal from the one or more further mobile terminals;
    transmitting mobile communication data from the first mobile terminal to the intermediary mobile terminal using direct device-to-device communications, wherein the mobile communication data is intended for transmission to a base station that is connected to the wireless communication network, wherein the mobile communication data comprises a first transmission configuration parameter; and
    receiving a second transmission configuration parameter at the first mobile terminal, wherein the second transmission configuration parameter is determined by the wireless communication network based on the first transmission configuration parameter.

2. The method of claim 1, further comprising:
    receiving one or more measured wireless signal characteristics at the first mobile terminal from at least one of the one or more further mobile terminals; and
    wherein the selecting an intermediary mobile terminal comprises selecting the intermediary mobile terminal from the one or more further mobile terminals based on the one or more measured wireless signal characteristics.

3. The method of claim 2,
    wherein each of the one or more measured wireless signal characteristics comprise a reference signal receive power (RSRP) measurement, and wherein the selecting an intermediary mobile terminal comprises selecting an intermediary mobile terminal based on the RSRP measurements.

4. The method of claim 1,
    selecting a reduced device-to-device transmit power for the first mobile terminal that is insufficient to complete Proximity Services (ProSe) transmissions from the first mobile terminal to the base station; and
    setting the reduced device-to-device transmit power as the device-to-device transmit power for the first mobile terminal.

5. The method of claim 4,
    wherein the device-to-device transmit power is set to the reduced device-to-device transmit power level before the one or further mobile terminals are identified.

6. The method of claim 1,
    wherein the mobile communication data comprises Proximity Services (ProSe) Discovery protocol data, and further comprising:
    receiving a ProSe Discovery grant at the first mobile terminal; and
    performing ProSe Discovery at the first mobile terminal.

7. The method of claim 1, further comprising:
    performing adjusted wireless transmissions at the first mobile terminal based on the second transmission configuration parameter.

8. The method of claim 7,
    wherein the first transmission configuration parameter comprises an initial transmission phase setting of the first mobile terminal, and wherein the second transmission configuration parameter comprises a new device-to-device transmission phase setting of the first mobile terminal.

9. A mobile terminal device comprising:
    a device-to-device processing circuit configured to receive a device-to-device transmit power assignment that assigns a device-to-device transmit power to the mobile terminal device that is insufficient to request Proximity Services (ProSe) permissions from a base station and, in response to the received device-to-device transmit power assignment, further configured to identify one or more further mobile terminals engaged in direct device-to-device communications with the mobile terminal device and configured to select an intermediary mobile terminal from the one or more further mobile terminals; and
    a transceiver configured to transmit a ProSe permission request from the mobile terminal device to the intermediary mobile terminal using direct device-to-device communications, wherein the ProSe permission request is intended for transmission to the base station that is connected to a wireless communication network.

10. The mobile terminal device of claim 9, wherein the direct device-to-device communications utilize wireless resources allocated by the wireless communication network for direct device-to-device communications.

11. The mobile terminal device of claim 10, wherein the ProSe permission request transmitted by the transceiver comprises a Proximity Services (ProSe) Discovery request.

12. The mobile terminal device of claim 11,
    wherein the device-to-device processing circuit is further configured to identify a target mobile terminal; and
    wherein the device-to-device processing circuit is further configured to control the transceiver to transmit a ProSe Communication request from the mobile terminal device to the intermediary mobile terminal using direct device-to-device communications.

13. The mobile terminal device of claim 12,
    wherein the transceiver is further configured to receive a ProSe Communication grant; and
    wherein the device-to-device processing circuit is further configured to perform ProSe Communication between the mobile terminal device and the target mobile terminal.

14. The mobile terminal device of claim 9, wherein the transceiver is further configured to receive radio measurements from the one or more further mobile terminals that indicate the condition of a link between the one or more further mobile terminals and the base station, the device-to-device processing circuit further configured to select the intermediary mobile terminal from the one or more further mobile terminals based on the received radio measurements.

15. A mobile terminal device comprising:
a device-to-device processing circuit configured to select an intermediary mobile terminal from one or more connected mobile terminals, where each of the one or more connected mobile terminals are engaged in direct device-to-device communications with the mobile terminal device; and
a transceiver configured to utilize the intermediary mobile terminal as a relay link to report a current device-to-device transmission parameter to a base station and to receive an updated device-to-device transmission parameter from the base station in response to the reported current device-to-device transmission parameter,
the transceiver further configured to adjust device-to-device transmissions according to the updated device-to-device transmission parameter to reduce interference to one or more proximate mobile terminals.

16. The mobile terminal device of claim 15, wherein the transceiver is further configured to receive one or more radio measurements from the one or more connected mobile terminals over direct device-to-device communications, each of the one or more radio measurements indicating link conditions between the one or more connected mobile terminals and the base station, and the device-to-device processing circuit further configured to select the intermediary mobile terminal based on the one or more radio measurements.

17. The mobile terminal device of claim 16, wherein the one or more radio measurements comprise Reference Signal Receive Power (RSRP) measurements.

18. The mobile terminal device of claim 15, where in the current device-to-device transmission parameter is a current transmission phase setting and the updated device-to-device transmission parameter is an updated phase setting that reduces interference relative to the current transmission phase setting.

19. The mobile terminal device of claim 15, wherein the transceiver is configured to utilize the intermediary mobile terminal as a relay link to request permission to perform Proximity Service (ProSe) discovery from the base station.

20. The mobile terminal device of claim 15, wherein, prior to selection of the intermediate mobile terminal, the device-to-device processing is configured to receive a device-to-device transmission power assignment that assigns the mobile terminal device with a device-to-device transmission power that is insufficient to report the current device-to-device transmission parameter to the base station with device-to-device signaling.

* * * * *